(12) United States Patent
Takeda et al.

(10) Patent No.: US 11,664,918 B2
(45) Date of Patent: May 30, 2023

(54) USER TERMINAL AND RADIO COMMUNICATION METHOD

(71) Applicant: NTT DOCOMO, INC., Tokyo (JP)

(72) Inventors: Daiki Takeda, Tokyo (JP); Kazuki Takeda, Tokyo (JP); Hiroki Harada, Tokyo (JP); Yousuke Sano, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 25 days.

(21) Appl. No.: 16/764,206

(22) PCT Filed: Nov. 16, 2017

(86) PCT No.: PCT/JP2017/041289
§ 371 (c)(1),
(2) Date: May 14, 2020

(87) PCT Pub. No.: WO2019/097633
PCT Pub. Date: May 23, 2019

(65) Prior Publication Data
US 2020/0366398 A1     Nov. 19, 2020

(51) Int. Cl.
*H04J 11/00* (2006.01)
*H04W 72/04* (2023.01)
*H04W 72/23* (2023.01)

(52) U.S. Cl.
CPC .......... *H04J 11/0069* (2013.01); *H04W 72/23* (2023.01)

(58) Field of Classification Search
CPC .......................... H04J 11/0069; H04W 72/042

USPC .......................................................... 370/350
See application file for complete search history.

(56) References Cited

U.S. PATENT DOCUMENTS

| | | | |
|---|---|---|---|
| 10,492,157 B2* | 11/2019 | Nam | H04W 48/12 |
| 2018/0324843 A1* | 11/2018 | Lee | H04L 5/0053 |
| 2019/0068348 A1* | 2/2019 | Nam | H04L 5/0053 |
| 2019/0150110 A1* | 5/2019 | Ko | H04W 56/001 |
| | | | 370/350 |
| 2019/0356524 A1* | 11/2019 | Yi | H04B 7/0695 |
| 2020/0119874 A1* | 4/2020 | Liu | H04L 5/0048 |
| 2020/0244530 A1* | 7/2020 | Lin | H04L 41/0866 |

(Continued)

OTHER PUBLICATIONS

U.S. Appl. No. 62/560,423, filed Sep. 19, 2017.*

(Continued)

*Primary Examiner* — Faisal Choudhury
(74) *Attorney, Agent, or Firm* — Osha Bergman Watanabe & Burton LLP

(57) ABSTRACT

A terminal is disclosed including a receiver that receives a synchronization signal/physical broadcast channel (SS/PBCH) block including a synchronization signal (SS) and a physical broadcast channel (PBCH); and a processor that determines a control resource set based on configuration information in a configuration information set of a plurality of configuration information sets, the configuration information set being associated with information based on the SS/PBCH block, the configuration information being associated with a value of a field in the PBCH, and the configuration information including a plurality of parameters regarding the control resource set. In other aspects, a radio communication method and a base station are also disclosed.

5 Claims, 15 Drawing Sheets

(56) References Cited

U.S. PATENT DOCUMENTS

2020/0288503 A1* 9/2020 Sahlin .................. H04L 5/0053
2020/0396122 A1* 12/2020 Da ....................... H04W 48/12

OTHER PUBLICATIONS

U.S. Appl. No. 62/544,212, filed Aug. 11, 2017.*
3GPP TSG RAN WG1 Meeting 90bis R1-1719198; Prague, CZ, Oct. 9-13, 2017.*
3GPP TSG RAN WG1 Meeting 90bis; R1-1718181 "Discussion on remaining details on RMSI delivery" NTT Docomo, Inc.; Prague, CZ; Oct. 9-13, 2017 (7 pages).
3GPP TSG RAN WG1 Meeting NR#3; R1-1715376 "Remaining details of NR-SS" ZTE, Sanechips; Nagoya, Japan; Sep. 18-21, 2017 (11 pages).
3GPP TSG RAN WG1 Meeting 90bis; R1-1719198 "Offline summary for AI 7.1.2.2 Remaining Minimum System Information" CATT; Prague, CZ; Oct. 9-13, 2017 (15 pages).
Extended European Search Report issued in European Application No. 17932165.8, dated Jun. 9, 2021 (9 pages).
International Search Report issued in Application No. PCT/JP2017/041289, dated Feb. 13, 2018 (3 pages).
Written Opinion issued in International Application No. PCT/JP2017/041289, dated Feb. 13, 2018 (3 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting #90bis; R1-1717461; "Discussion on Remaining Minimum System Information;" vivo; Oct. 9-13, 2017; Prague, Czech Republic (15 pages).
Office Action issued in the counterpart Indian Patent Application No. 202037024627, dated Mar. 24, 2022 (6 pages).
Office Action issued in the counterpart African Patent Application No. AP/P/2020/012438, dated Mar. 30, 2022 (5 pages).
Office Action issued in the counterpart Japanese Patent Application No. 2019-554115, dated Feb. 8, 2022 (6 pages).
Office Action issued in Korean Application No. 10-2020-7015049 dated Jul. 18, 2022 (8 pages).
NTT Docomo, Inc. "Discussion on remaining details on NR-PBCH and PBCH-DMRS", 3GPP TSG RAN WG1 Meeting 90bis, R1-1718180, Prague, CZ, Oct. 9-13, 2017 (15 pages).
Office Action issued in Korean Application No. 10-2020-7015049 dated Feb. 27, 2023 (8 pages).
Nokia, Nokia Shanghai Bell; "Remaining details on NR-PBCH"; 3GPP TSG-RAN WG1 NR AH#3, R1-1716524; Nagoya, Japan; Sep. 18-21, 2017 (10 pages).
ZTE, Sanechips; "Remaining details of RMSI"; 3GPP TSG RAN WG1 Meeting #90bis, R1-1717032; Prague, Czech Republic; Oct. 9-13, 2017 (12 pages).
3GPP TS 38.213 V1.1.1; "3rd Generation Partnership Project; Technical Specification Group Radio Access Network; NR; Physical layer procedures for control (Release 15)"; Nov. 2017 (46 pages).

* cited by examiner

FIG. 2A sub6 BAND RMSI CORESET CONFIGURATION TABLE

| RMSI CORESET CONFIGURATION BIT INFORMATION | MULTIPLEXING SCHEME | DMRS MAPPING TYPE | CORESET BANDWIDTH [RB] | CORESET DURATION [SYMBOL] |
|---|---|---|---|---|
| 0000 0000 | TDM | WIDEBAND | 24 | 1 |
| 0000 0001 | TDM | WIDEBAND | 48 | 1 |
| ... | ... | ... | ... | ... |

FIG. 2B mmW BAND RMSI CORESET CONFIGURATION TABLE

| RMSI CORESET CONFIGURATION BIT INFORMATION | MULTIPLEXING SCHEME | DMRS MAPPING TYPE | CORESET BANDWIDTH [RB] | CORESET DURATION [SYMBOL] |
|---|---|---|---|---|
| 0000 0000 | FDM | WIDEBAND | 24 | 1 |
| 0000 0001 | FDM | WIDEBAND | 24 | 2 |
| ... | ... | ... | ... | ... |

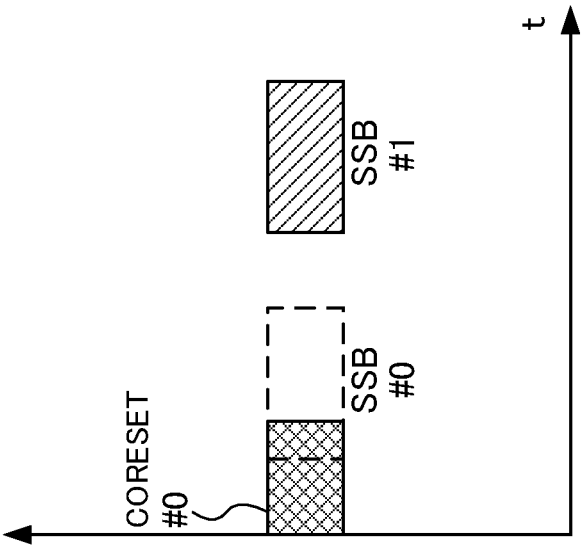
FIG. 3A ONE SYMBOL CORESET
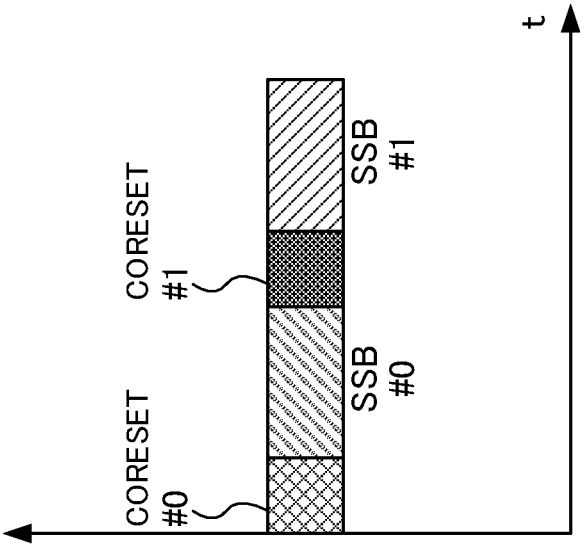
FIG. 3B TWO SYMBOL CORESET
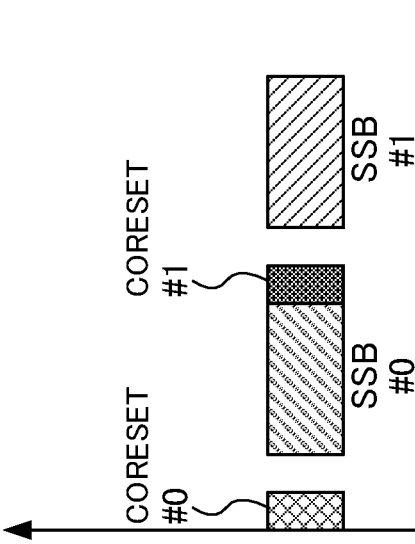
FIG. 3C THREE SYMBOL CORESET

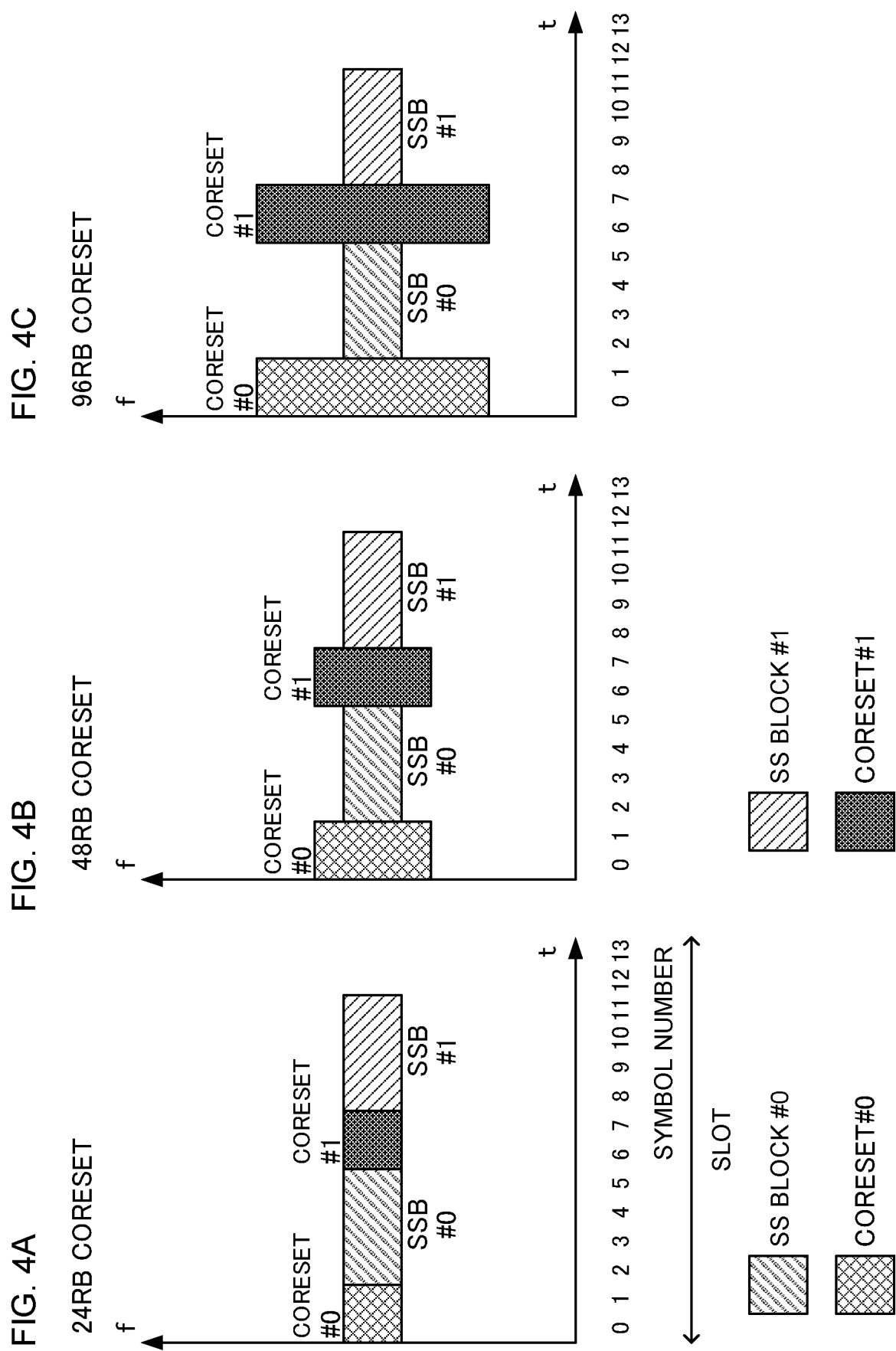

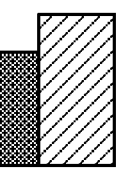
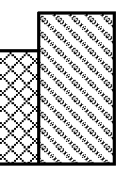
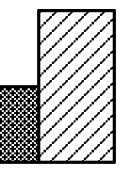
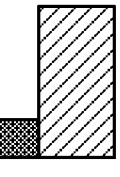
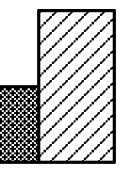
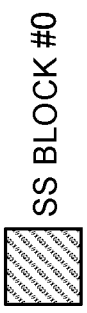
FIG. 5A ONE SYMBOL CORESET
FIG. 5B TWO SYMBOL CORESET
FIG. 5C THREE SYMBOL CORESET

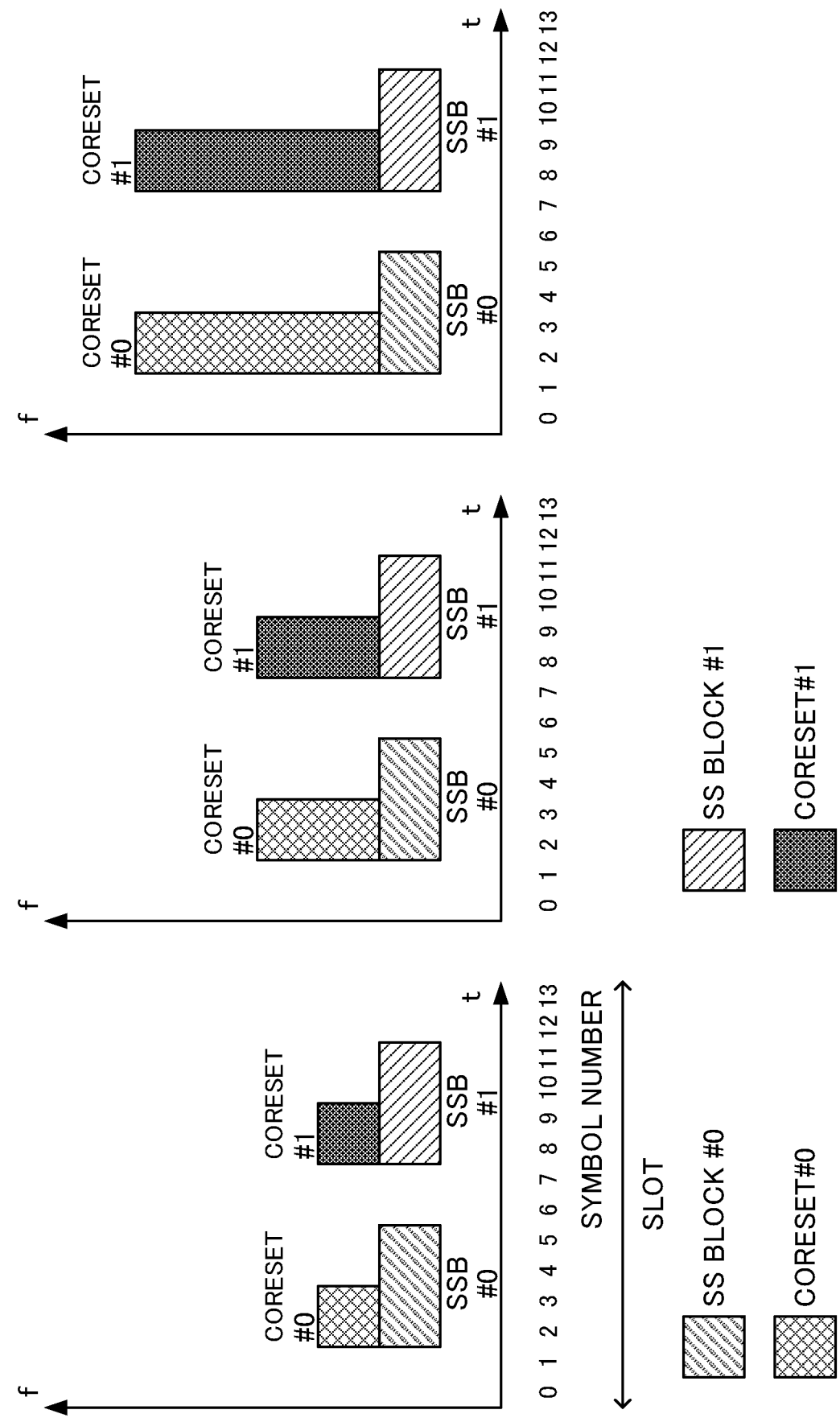

FIG. 7A sub6 BAND RMSI CORESET CONFIGURATION TABLE

| RMSI CORESET CONFIGURATION BIT INFORMATION | MULTIPLEXING SCHEME | DMRS MAPPING TYPE | CORESET BANDWIDTH [RB] | CORESET DURATION [SYMBOL] | CORESET MAPPING TYPE |
|---|---|---|---|---|---|
| 0000 0000 | TDM | WIDEBAND | 24 | 1 | 1 |
| 0000 0001 | TDM | WIDEBAND | 48 | 1 | 1 |
| ... | ... | ... | ... | ... | ... |

FIG. 7B mmW BAND RMSI CORESET CONFIGURATION TABLE

| RMSI CORESET CONFIGURATION BIT INFORMATION | MULTIPLEXING SCHEME | DMRS MAPPING TYPE | CORESET BANDWIDTH [RB] | CORESET DURATION [SYMBOL] | CORESET MAPPING TYPE |
|---|---|---|---|---|---|
| 0000 0000 | FDM | WIDEBAND | 24 | 1 | 1 |
| 0000 0001 | FDM | WIDEBAND | 24 | 2 | 1 |
| ... | ... | ... | ... | ... | ... |

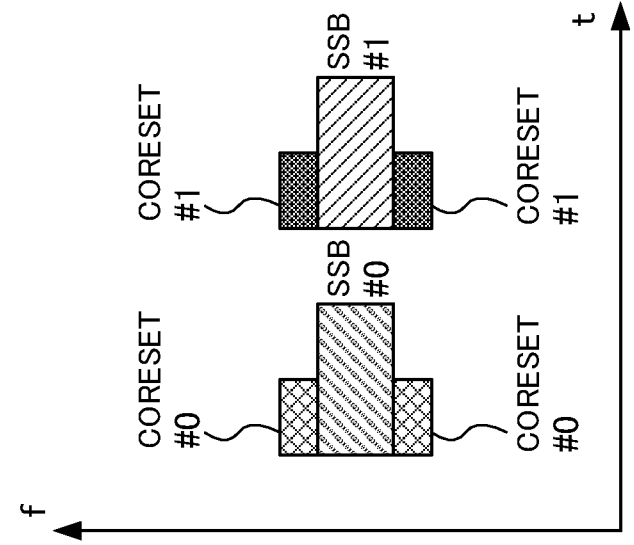
FIG. 8A TYPE 1
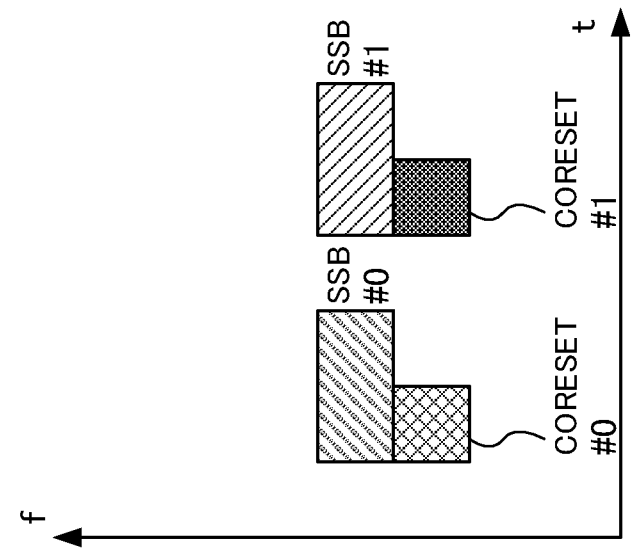
FIG. 8B TYPE 2
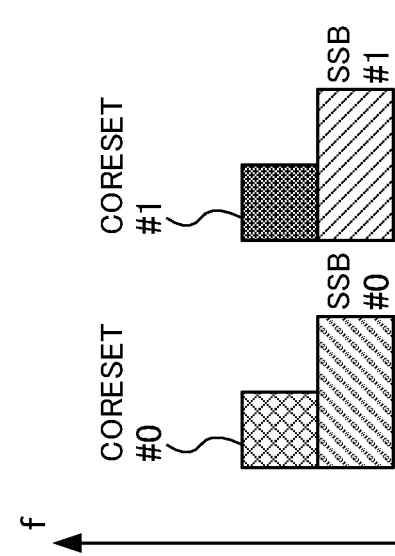
FIG. 8C TYPE 3

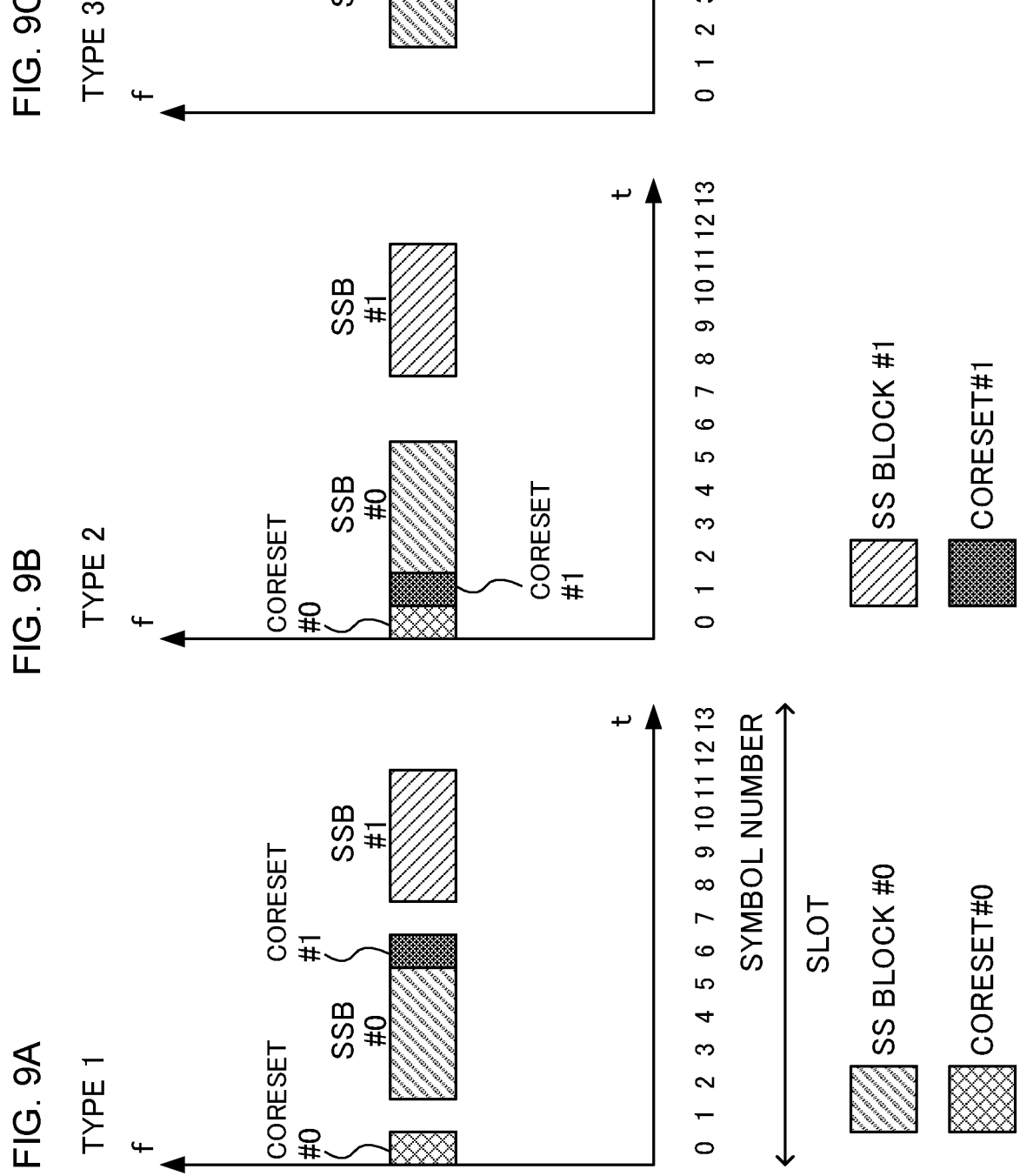

USER TERMINAL AND RADIO COMMUNICATION METHOD

FIELD OF THE INVENTION

The present invention relates to a user terminal and a radio communication method in a next generation mobile communication system.

BACKGROUND OF THE INVENTION

In the universal mobile telecommunications system (UMTS) network, the long term evolution (LTE) has been specified to achieve a higher data rate, a lower delay, or the like (See Non-Patent Literature 1). In addition, the LTE-advanced (LTE-A, LTE Rel. 10, 11, 12, and 13) has been specified to achieve a higher capacity, advancement, or the like of the LTE (LTE Rel. 8 and 9).

Successor systems to the LTE (such as future radio access (FRA), 5th generation mobile communication system (5G), 5G+ (plus), new radio (NR), new radio access (NX), future generation radio access (FX), and LTE Rel. 14, 15, or subsequent versions) are also being discussed.

In the existing LTE systems (such as LTE Rel. 8 to 13), the user terminal (UE: User Equipment) detects a synchronization signal (such as a primary synchronization signal (PSS) and/or a secondary synchronization signal (SSS)) through an initial access sequence (also referred to as "cell search" or the like), acquires synchronization with the network (for example, synchronization with a radio base station (eNB or eNodeB)), and identifies the connected cell (for example, using the cell identifier (ID)).

After the cell search, the user terminal receives a master information block (MIB) transmitted via a broadcast channel (such as a physical broadcast channel (PBCH)), a system information block (SIB) transmitted via a downlink (DL) shared channel (such as a physical downlink shared channel (PDSCH), or the like, and obtains configuration information (also referred to as "broadcast information", "system information", or the like) for communication with the network.

CITATION LIST

Non-Patent Literatures

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF THE INVENTION

For future radio communication systems (such as "NR" or "5G"), studies have been made for a method in which resource units including synchronization signals and broadcast channels are defined as a synchronization signal block (SS block), and initial access is performed on the basis of the SS block. The synchronization signal is also referred to as "PSS", "SSS", "NR-PSS", "NR-SSS", and/or the like. The broadcast channel is also referred to as "PBCH", "NR-PBCH", or the like. The synchronization signal block is also referred to as "SS block", "SS/PBCH block", or the like.

In the initial access using the SS block, information regarding an region where a downlink control channel is configured or the like is notified to the UE using the NR-PBCH included in the SS block. The configured region of the downlink control channel (such as a physical downlink control channel (NR-PDCCH) is also referred to as "control resource set (CORESET)", "control resource set", "control subband", "search space set", "search space resource set", "control region", "control subband", "NR-PDCCH region", or the like.

However, how to notify information regarding the configured region of the downlink control channel (referred to as "CORESET configuration", "CORESET information", or the like) or the like to the UE by incorporating it in the NR-PBCH has not been defined. In addition, how to notify the data allocation region using the downlink control channel included in the configured region of the downlink control channel has not been defined.

In view of the aforementioned problems, it is an object of the present invention to provide a user terminal and a radio communication method, capable of appropriately notifying information regarding a configured region of a control channel in a radio communication system using a synchronization signal block.

According to an aspect of the invention, there is provided a user terminal including: a receiving unit configured to receive a synchronization signal block including bit information regarding a configuration of a control resource set; and a control unit configured to control determination of the configuration of the control resource set on the basis of configuration information associated with the bit information in a configuration information set associated with indication information based on the receiving.

According to the present invention, it is possible to appropriately notify information regarding a configured region of a control channel in a radio communication system using a synchronization signal block.

BRIEF DESCRIPTION OF DRAWINGS

FIGS. 2A and 2B are diagrams illustrating an exemplary table of a plurality of RMSI CORESET configurations different depending on a frequency band of the SS block;

FIGS. 3A to 3C are diagrams illustrating exemplary CORESET mapping when the SS block and the RMSI CORESET are subjected to time division multiplexing (TDM), and different CORESET durations are configured depending on the RMSI CORESET configuration bit information;

FIGS. 4A to 4C are diagrams illustrating exemplary CORESET mapping when the SS block and the RMSI CORESET are subjected to TDM, and different CORESET bandwidths are configured depending on the RMSI CORESET configuration bit information;

FIGS. 5A to 5C are diagrams illustrating exemplary mapping when the SS block and the RMSI CORESET are subjected to frequency division multiplexing (FDM), and different CORESET durations are configured depending on the CORESET configuration bit information;

FIGS. 6A to 6C are diagrams illustrating exemplary mapping of the CORESET when the SS block and the RMSI CORESET are subjected to FDM, and different CORESET bandwidths are configured depending on the CORESET configuration bit information;

FIGS. 7A and 7B are diagrams illustrating exemplary RMSI CORESET configuration tables including the CORESET mapping type;

FIGS. 8A to 8C are diagrams illustrating exemplary CORESET mapping types when the SS block and the RMSI CORESET are subjected to FDM;

FIGS. 9A to 9C are diagrams illustrating exemplary CORESET mapping types when the SS block and the RMSI CORESET are subjected to TDM;

DESCRIPTION OF EMBODIMENTS

For future radio communication systems (such as LTE Rel. 14 or subsequent versions, 5G, and NR), studies have been made for defining a signal block (also referred to as "SS/PBCH block" or "SS/PBCH block") including a synchronization signal (also referred to as "SS", "PSS", "SSS", "NR-PSS", and/or "NR-SSS") and a broadcast channel (also referred to as "broadcast signal", "PBCH", or "NR-PBCH"). A set of one or more signal blocks is also referred to as "signal burst" ("SS/PBCH burst" or "SS burst"). A plurality of signal blocks in the signal burst are transmitted using different beams at different time points (this is also referred to as "beam sweep").

The "SS/PBCH" block consists of one or more symbols (such as OFDM symbols). Specifically, the SS/PBCH block may also include a plurality of continuous symbols. The PSS, the SSS, and the NR-PBCH may also be arranged in different one or more symbols inside the SS/PBCH block. For example, a study has been also made for four or five symbols of the SS/PBCH block including one symbol of "PSS", one symbol of "SSS", and two or three symbols of "PBCH".

A set of one or a more SS/PBCH blocks may also be referred to as "SS/PBCH burst". The SS/PBCH burst may also include a SS/PBCH block having continuous frequency and/or time resources or a SS/PBCH block having discontinuous frequency and/or time resources. The SS/PBCH burst may be configured at a predetermined periodicity basis (this may also be referred to as "SS/PBCH burst periodicity") or may be configured on an aperiodic basis.

One or more SS/PBCH bursts may also be referred to as a "SS/PBCH burst set (SS/PBCH burst series)". The SS/PBCH burst set is configured periodically. The user terminal may control receiving processing by assuming that the SS/PBCH burst set is periodically transmitted (at a SS/PBCH burst set periodicity (SS burst set periodicity)).

Figure 1A:
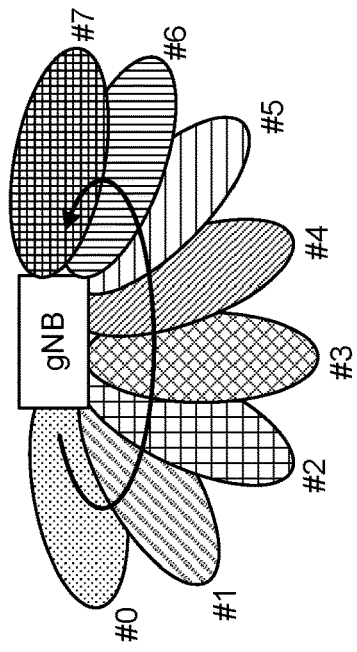
FIGS. 1A and 1B are diagrams illustrating exemplary SS burst sets.
Figure 1B:
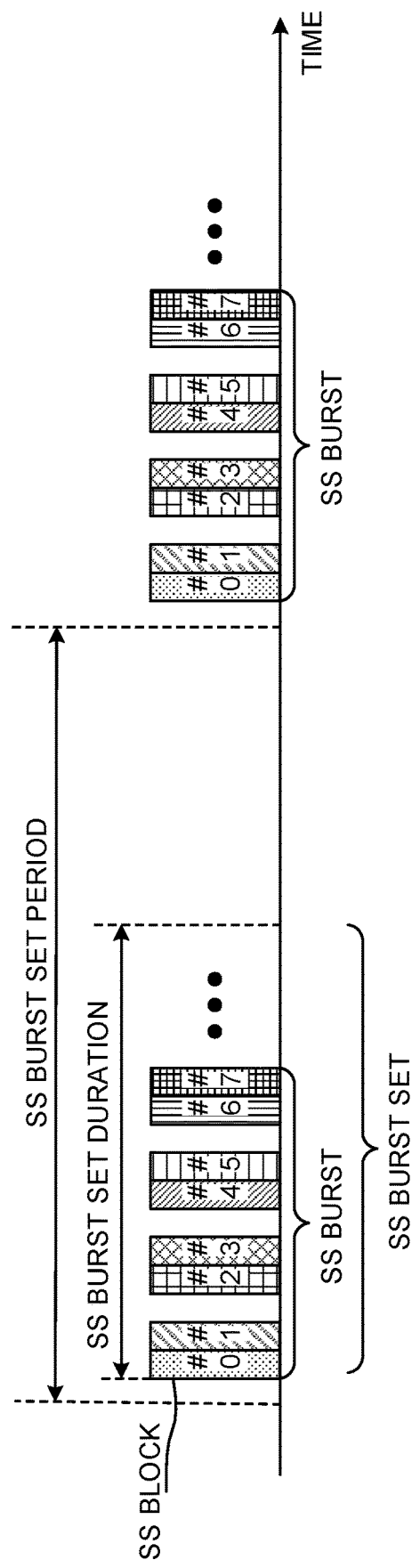

FIG. 1 is a diagram illustrating an exemplary SS burst set. FIG. 1A illustrates exemplary beam sweeping. As illustrated in FIGS. 1A and 1B, the radio base station (for example, gNB) may transmit different SS blocks using different beams by differently configuring beam directivities depending on time (beam sweeping). Note that, although FIGS. 1A and 1B illustrate a multiple beam example, the SS block may be transmitted using a single beam.

As illustrated in FIG. 1B, the SS burst consists of one or more SS blocks, and the SS burst set has one or more SS bursts. For example, although the SS burst includes eight SS blocks #0 to #7 in FIG. 1B, the invention is not limited thereto. The SS blocks #0 to #7 may also be transmitted via different beams #0 to #7 (FIG. 1A).

As illustrated in FIG. 1B, the SS burst set including the SS blocks #0 to #7 may also be transmitted so as not to exceed a predetermined duration (for example, 5 ms or shorter, also referred to as an "SS burst set duration"). In addition, the SS burst set may be repeated on a predetermined periodicity basis (for example, 5, 10, 20, 40, 80, or 160 ms, and may also be referred to as "SS burst set periodicity" or the like).

Note that, although predetermined time intervals are provided between the SS blocks #1, #2, #3, #4, #5, and #6 in FIG. 1B, the time interval may not be provided, or may be provided between other SS blocks (for example, "between the SS blocks #2, #3, #5, and #6" or the like). During the time interval, for example, a DL control channel (also referred to as "PDCCH", "NR-PDCCH", "downlink control information (DCI)", or the like) may also be transmitted, and/or a UL control channel (also referred to as a "physical uplink control channel (PUCCH)") may also be transmitted from the user terminal. For example, if each SS block consists of four symbols, two symbols of PDCCH, two SS blocks, two symbols of PUCCH, and a guide time may be included in a slot having fourteen symbols.

An index of the SS block (SS block index) is notified using the PBCH included in the SS block (or PBCH demodulation reference signal (DMRS)). The UE can recognize the SS block index of the received SS block on the basis of the PBCH (or PBCH DMRS).

A study has been made for a method in which the radio base station notifies the UE of information regarding the region where the downlink control channel (PDCCH) is configured using the PBCH. The information regarding the configured region of the PDCCH may also be referred to as "control resource set configuration (CORESET configuration)", "control resource set configuration", or "PDCCH configuration".

A study has been made for a method in which the radio base station schedules the system information (such as remaining minimum system information (RMSI)) using the PDCCH. A part of the minimum system information (MSI) read by the UE at the time of initial access is carried by the PBCH. The remaining MSI is the RMSI, and is similar to the system information block (SIB) 1 or SIB2 in the LTE. The RMSI may be broadcasted via a single TB or may be segmented into a plurality of TBs. In this case, the segmented RMSI may also be referred to as "NR-SIB1" or "NR-SIB2".

Here, the RMSI will be described.

A single DL numerology is applied to the RMSI, paging, Message 2 (Msg. 2), Message 4 (Msg. 4) for the initial access, and a broadcast OSI (Other System Information). The broadcast OSI is the system information other than the MSI and may also be broadcasted by the PDCCH or the like.

The NB-PBCH carries one bit of the numerology information. For example, the numerology information indicates a sub-carrier interval of 15 kHz or 30 kHz for a frequency of 6 GHz. The same sub-carrier interval is used for the data channel and the control channel of the RMSI and the paging.

The PDSCH that carries the RMSI is limited to an initial active DL bandwidth part (BWP). The BWP includes one or more frequency bands (partial bands) within the carrier used in DL and/or UL communication (also referred to as a "component carrier (CC)", "system band", or the like). The initial active DL BWP is the DL BWP configured at the time of the initial access.

The RMSI may be common to all of the beams. The configuration information of all random access channels (RACH) is broadcasted via all of the RMSI beams in the cell. The RMSI at least includes a list of public land mobile networks (PLMN), a cell ID, a cell camping parameter, and a RACH parameter.

The UE receives the PDCCH and the physical downlink shared channel (PDSCH) scheduled by the PDCCH and acquires the RMSI in the PDSCH on the basis of the control resource set configuration notified by the PBCH.

The UE uses a window (RMSI PDCCH monitoring window) for monitoring the PDCCH (RMSI PDCCH) used to schedule the RMSI. The RMSI PDCCH monitoring window is associated with the SS block. The RMSI PDCCH monitoring window is repeated periodically. That is, the RMSI PDCCH monitoring window indicates the timing at which the UE reads the RMSI.

Each RMSI PDCCH monitoring window has a duration of "x" continuous slots. The periodicity "y" of the monitoring window may be equal to or different from the periodicity of the SS burst set.

The content notified by incorporating the control resource set configuration into the PBCH is not determined specifically, so that how to configure the specific notification method (such as the number of bits and the content) of the control resource set configuration and notify the UE is problematic.

Since the resources applicable to the PBCH is also limited, it is desirable to suppress a payload of the PBCH to the minimum as necessary to increase redundancy and improve a detection ratio and suppress a configuration range and/or granularity of the control resource set configuration.

If the frequency band is low (at a low frequency band such as "6 GHz or lower", which may also be referred to as "sub6"), the number of the applied beams is also small, compared to a high frequency band (for example, 6 GHz or higher, which may also be referred to as "millimeter wave: mmW"). In addition, within the high frequency band, considering a fact that multiple beams are applied, it is desirable to configure the control resource set configuration with a wide range and/or with fine granularity.

The contents (parameters) of the control resource set configuration notified using the PBCH may include a bandwidth (BW), a duration (such as the number of symbols), a start timing, and a frequency position of the control resource set. At least one of the contents is notified using the bit information included in the PBCH.

It is conceived that a table is defined by associating the bit information included in the PBCH with the content of the control resource set configuration when a part or all of the bandwidth, the duration, the start timing, and the frequency position of the control resource set are notified. The UE may determine the control resource set configuration on the basis of the bit information included in the PBCH and the predefined table and receive the downlink control channel transmitted using the control resource set.

For example, it is conceived that one table is defined by associating the bit information included in the PBCH with the control resource set configuration. In this case, regardless of a sub-carrier spacing (SCS) and/or a frequency band used in transmission of the SS block, the control resource set configuration may be notified as the bit information using a single common table.

In this manner, although a study has been made for a method in which the configuration information necessary in the CORESET (RMSI CORESET) for RMSI scheduling is explicitly notified using the PBCH payload, the PBCH payload size is limited. Meanwhile, for flexible configuration of the RMSI CORESET, it is desirable to configure many parameters such as a time position, a frequency position, a time width, and a bandwidth of the RMSI CORESET, a multiplexing scheme with the SS block, or the like.

The inventors achieved the present invention by studying a method of flexibly configuration the CORESET using the limited notification bit in the PBCH.

Embodiments of the present invention will now be described in details with reference to the accompanying drawings. The radio communication methods according to each embodiment may be applied solely or in combination.

First Aspect

The PBCH includes RMSI CORESET configuration bit information (which may also be referred to as "bit field"). The radio base station reduces the information amount necessary for notifying the RMSI CORESET configuration by performing joint-coding for a plurality of parameters (configuration information) regarding the RMSI CORESET configuration.

The UE may use different tables (RMSI CORESET configuration tables) depending on the indication information obtained implicitly and/or explicitly at the time of receiving the SS block (SS and PBCH). A plurality of RMSI CORESET configuration tables may be defined in the specification.

For example, different RMSI CORESET configuration tables may be conceivable depending on the numerology of the SS (such as the sub-carrier spacing). In addition, different RMSI CORESET configuration tables may be conceivable depending on the frequency band of the SS (for example, depending on whether or not the frequency band is higher than a predetermined frequency or the frequency band number).

Different RMSI CORESET configuration tables may be conceivable depending on the frequency band of the SS. In other words, the UE and the radio base station may change the RMSI CORESET configuration table depending on the information regarding the frequency bands.

Different RMSI CORESET configuration tables may also be conceivable depending on the numerology of the RMSI CORESET. In other words, the UE and the radio base station may change the RMSI CORESET configuration table depending on the information regarding the numerology.

The indication information may be based on at least one of the SS, the PBCH, and the PBCH DMRS of the received SS block.

The indication information may be information based on the SS. For example, the indication information may include at least one of the frequency band of the SS (such as whether or not the frequency band is higher than a predetermined frequency or the frequency band number), the numerology of the SS (such as the sub-carrier spacing), and the cell ID.

The indication information may be information based on the PBCH. For example, the indication information may include at least one of a system frame number (SFN), a half radio frame timing indication, an SS block frequency offset indication, a CORESET configuration, the RMSI, the paging, the numerologies of the Messages 2 and 4, initial DMRS position information, or the information for quickly classifying whether or not the UE is not serviceable in the cell or the carrier.

The indication information may include information based on the PBCH DMRS. For example, the indication information may include the SS block index.

As illustrated in FIG. 2, the RMSI CORESET configuration table correlates a plurality of parameters with the bit information indicating the RMSI CORESET configuration (the RMSI CORESET configuration bit information or the bit field).

The PBCH includes the RMSI CORESET configuration bit information.

The UE may recognize the RMSI CORESET configuration using the parameter corresponding to the RMSI CORESET configuration bit information in the RMSI CORESET configuration table corresponding to the indication information. The UE monitors the PDCCH in the CORESET expressed in the recognized RMSI CORESET configuration and decodes the RMSI scheduled by the PDCCH.

The RMSI CORESET configuration table may include at least one of the information regarding the frequency resource of the CORESET, the information regarding the time resource of the CORESET, the DMRS mapping type, or other relating parameters.

The information regarding the frequency resource of the CORESET may also include at least one of the CORESET bandwidth (for example, expressed as the number of RBs) and the CORESET frequency position (for example, expressed as the frequency offset relative to the SS block).

The information regarding the time resource of the CORESET may include at least one of the information indicating a continuous OFDM symbol index set in a slot corresponding to the CORESET and the CORESET duration (for example, the number of symbols of the CORESET).

The DMRS mapping type may indicate one of the DMRS mapped to all of the REGs in the carrier (which may also be referred to "wideband") and the DMRS mapped to the CORESET (which may also be referred to as "CORESET"). Note that the DMRS mapping type may also indicate DMRS mapped to the BWP (bandwidth part).

Other relating parameters may include the RMSI timing configuration indicating the timing of the RMSI. The RMSI timing configuration may also include at least one of the RMSI PDCCH, the monitoring window periodicity, the RMSI PDCCH monitoring window duration, and the RMSI PDCCH monitoring window offset.

In the example of FIG. 2, the UE and the radio base station use a plurality of RMSI CORESET configuration tables different depending on the frequency band of the SS block. For example, the RMSI CORESET configuration table (FIG. 2A) associated with the sub6 band (equal to or lower than 6 GHz) and the RMSI CORESET configuration table (FIG. 2B) associated with the mmW band (equal to or higher than 6 GHz) are used.

Each entry of the RMSI CORESET configuration table includes fields indicating the RMSI CORESET configuration bit information, the multiplexing scheme of the SS block and the RMSI CORESET, the DMRS mapping type, the CORESET bandwidth, and the CORESET duration. Here, the CORESET configuration bit information has a length of eight bits.

Since the sub6 band has a smaller number of beams and shorter time necessary for the beam sweeping, compared to the mmW band, the time resources necessary for the TDM of the SS block and the CORESET can be secured in some cases. Since the mmW band has a larger number of beams and longer time necessary for the beam sweeping, compared to the sub6 band, and the time resources for the SS block and the CORESET are limited, it is desirable to perform the FDM for the SS block and the CORESET in some cases. In the example of FIG. 2, the SS block and the CORESET of the sub6 band are subjected to TDM, and the SS block and the CORESET of the mmW band are subjected to FDM.

In a case where the SS block and the CORESET are subjected to TDM, the frequency resources applicable to the CORESET increase in some cases, compared to a case where the SS block and the CORESET are subjected to FDM. In the example of FIG. 2, the CORESET bandwidth of the mmW band is limited to a predetermined value (24 RBs), and the CORESET bandwidth of the sub6 band may be configured to a predetermined value or wider.

In a case where the SS block and the CORESET are subjected to FDM, the time resources applicable to the CORESET increase in some case, compared to a case where the SS block and the CORESET are subjected to TDM. In the example of FIG. 2, the CORESET duration of the sub6 band is limited to a predetermined value (one symbol), and the CORESET duration of the mmW band can be configured to a predetermined value or longer.

It is possible to guarantee the quality of the RMSI CORESET by configuring the duration and/or the bandwidth of the RMSI CORESET using the CORESET configuration bit information.

It is possible to flexibly configure the RMSI CORESET configuration while suppressing the information amount necessary for the notification of the RMSI CORESET configuration by performing joint-coding for a plurality of parameters associated with the RMSI CORESET configuration. Because the UE and the radio base station use the RMSI CORESET configuration table, it is possible to match the recognition of the RMSI CORESET configuration while suppressing the information amount necessary for notification of the RMSI CORESET configuration. In addition, since the RMSI CORESET configuration table different depending on the frequency band indicates different multiplexing schemes, it is possible to use a multiplexing scheme suitable for the frequency band. Furthermore, since the RMSI CORESET configuration table indicates the DMRS mapping type, it is possible to use DMRS arrangement suitable for the RMSI CORESET.

Since the UE uses the RMSI CORESET configuration table different depending on the indication information obtained explicitly or implicitly by receiving the SS block, it is possible to flexibly configure the RMSI CORESET even when the length of the RMSI CORESET configuration bit information is limited. In addition, by selecting the RMSI CORESET configuration table depending on the indication information, it is possible to determine the RMSI CORESET configuration regardless of a relationship between the numerology of the SS block and the numerology of the RMSI CORESET. Furthermore, the UE and the radio base station can use the RMSI CORESET configuration suitable for a situation by selecting the RMSI CORESET configuration table depending on the indication information.

The entries of the RMSI CORESET configuration table may include the RMSI CORESET configuration information. The RMSI CORESET configuration table may include the configuration information set.

Second Aspect

In the second aspect, a method of configuring the RMSI CORESET mapping will be described.

The UE and the radio base station may determine the RMSI CORESET mapping (arrangement) on the basis of the indication information, the RMSI CORESET configuration bit information, and the RMSI CORESET configuration table. For example, the mapping associated with specific information such as the frequency bands of the SS block and/or the RMSI CORESET, the numerologies of the SS block and/or the RMSI CORESET, and the multiplexing schemes of the SS block and the RMSI CORESET may be configured in advance, and the UE and the radio base station may determine the mapping corresponding to the specific information for the RMSI CORESET.

The mapping of the RMSI CORESET may include a relative position of the RMSI CORESET with respect to the position of the SS block (the time resource and/or the frequency resource).

The RMSI CORESET configuration table may contain a parameter (field) indicating the mapping of the RMSI CORESET. The UE may determine the mapping of the RMSI CORESET on the basis of information obtained from at least one of the designation information, the RMSI CORESET configuration bit information, and the RMSI CORESET configuration table. For example, the UE may calculate a relative position of the RMSI CORESET with respect to the SS block using the parameter obtained from the RMSI CORESET configuration table and a predetermined formula.

Since the RMSI CORESET configuration table contains information indicating the mapping of the RMSI CORESET, it is possible to more flexibly notify the CORESET configuration even when the length of the RMSI CORESET configuration bit information is limited.

FIGS. 3 and 4 illustrate exemplary mapping of the CORESET when the frequency band is the sub6 band, and the SS block and the CORESET are subjected to TDM.

Out of the symbols #0 to #13 within a single slot, the SS block #0 is transmitted during the symbols #2 to #5, and the SS block #1 is transmitted during the symbols #8 to #11. The SS block is not transmitted during two symbols (symbols #0 and #1) at the head of the slot (ahead of the SS block #0). In addition, the SS block is not transmitted during two symbols (symbols #6 and #7) at the tail of the SS block #0 (ahead of the SS block #1).

FIG. 3 illustrates exemplary mapping of the CORESET when the SS block and the RMSI CORESET are subjected to TDM, and different CORESET durations are configured depending on the RMSI CORESET configuration bit information. Here, the bandwidth of the CORESET is equal to the bandwidth of the SS block. Here, the CORESET has the same bandwidth as that of the SS block, and the CORESET has the same center frequency as that of the SS block.

FIGS. 3A, 3B, and 3C illustrate cases where the CORESET durations are one symbol, two symbols, and three symbols, respectively.

When the CORESET duration is one symbol as illustrated in FIG. 3A, and when the CORESET duration is two symbols as illustrated in FIG. 3B, the CORESET #0 is mapped to a head of the slot (symbols #0 and #1), and the CORESET #1 is mapped to a tail of the SS block (SSB) #0 (symbols #6 and #7).

When the CORESET duration is three symbols as illustrated in FIG. 3C, the CORESET #0 is mapped to a head of the slot. The SS block #0 is punctured in order to avoid overlapping with the CORESET #0. In addition, the CORESET #1 is not mapped in order to avoid overlapping with the SS block #1. Therefore, only the CORESET #0 and the SS block #1 are mapped.

The UE may determine whether or not there is a SS block transmitted in practice on the basis of at least one of the indication information, the RMSI CORESET configuration bit information, and the RMSI CORESET configuration table (it may also be determined whether or not an SS block having a specific SS block index is transmitted in practice).

The UE is not allowed to recognize whether or not there is another SS block in that slot when the initial SS block is searched. For example, if the UE recognizes that three symbols of the CORESET is subjected to TDM along with the SS block on the basis of the indication information, the RMSI CORESET configuration bit information in the PBCH, and the RMSI CORESET configuration table by decoding the PBCH, it may recognize that there is no SS block in the position of the SS block #0.

In other words, the UE may not consider a case where there are the SS block #0 and three symbols of the CORESET. In addition, if the CORESET duration is equal to or longer than a predetermined value, the position of the SS block is differently analyzed, compared to a case where the CORESET duration is shorter than the predetermined value. Furthermore, the UE may not consider a case where the CORESET and the SS block are overlapped.

Similar to FIG. 2A, FIG. 4 illustrates exemplary mapping of the CORESET when the SS block and the RMSI CORESET are subjected to TDM, and different CORESET durations are configured depending on the RMSI CORESET configuration bit information. Here, the SS block and the CORESET have the same center frequency. The SS block has a bandwidth of 24 RBs. The CORESET has a duration of two symbols.

FIGS. 4A, 4B, and 4C illustrate cases where the CORESET bandwidths are 24 RBs, 48 RBs, and 96 RBs, respectively.

In the example of FIGS. 5 and 6, for example, the frequency band is the mmW band, and the SS block and the CORESET are subjected to FDM. Here, the band of the CORESET is adjacent to the band of the SS block, and the frequency of the CORESET is higher than that of the SS block. The symbol at the head of the CORESET is identical to the symbol at the head of the SS block.

Similar to FIG. 2B, FIG. 5 illustrates exemplary mapping when the SS block and the RMSI CORESET are subjected to FDM, and different CORESET durations are configured depending on the CORESET configuration bit information. Here, the SS block and the CORESET have the same band.

FIGS. 5A, 5B, and 5C illustrate cases where the CORESET durations are one symbol, two symbols, and three symbols, respectively.

FIG. 6 illustrates exemplary mapping of the CORESET when the SS block and the RMSI CORESET are subjected to FDM, and different CORESET bandwidths are configured depending on the CORESET configuration bit information. Here, the SS block has a bandwidth of 24 RBs.

FIGS. 6A, 6B, and 6C illustrate cases where the CORESET bandwidths are 24 RBs, 48 RBs, and 96 RBs, respectively.

As illustrated in FIG. 7, each entry of the RMSI CORESET configuration table may include a field of the CORESET mapping type. The CORESET mapping type may indicate one of a plurality of CORESET mapping types configured in advance.

A plurality of CORESET mapping types configured in advance may change depending on the multiplexing scheme. For example, as illustrated in FIG. 7A, referring to the RMSI CORESET configuration table associated with the sub6 band, the multiplexing scheme is "TDM". Therefore, the CORESET mapping type indicates one of a plurality of CORESET mapping types for the TDM. For example, as illustrated in FIG. 7B, referring to the RMSI CORESET configuration table associated with the mmW band, the multiplexing scheme is "FDM". Therefore, the CORESET mapping type indicates one of a plurality of CORESET mapping types for the FDM.

FIG. 8 illustrates an exemplary CORESET mapping type when the SS block and the RMSI CORESET are subjected to FDM. Here, the band of the CORESET is adjacent to the band of the SS block.

Although it is assumed here that the CORESET has the same bandwidth as that of the SS block, the CORESET may have a bandwidth different from that of the SS block.

As illustrated in FIG. 8A, in the case of the CORESET mapping type 1 of the FDM, the frequency of the CORESET is higher than the frequency of the SS block. As illustrated in FIG. 8B, in the case of the CORESET mapping type 2 of the FDM, the frequency of the CORESET is lower than the frequency of the SS block. As illustrated in FIG. 8C, in the case of the CORESET mapping type 3 of the FDM, the CORESET is divided into two bands having a half bandwidth, and the two bands are adjacent to both sides of the band of the SS block.

FIG. 9 illustrates an exemplary CORESET mapping type when the SS block and the RMSI CORESET are subjected to TDM. Here, the band of the CORESET is identical to the band of the SS block. That is, the CORESET has the same bandwidth as that of the SS block, and the CORESET has the same center frequency as that of the SS block. The CORESET duration is one symbol.

Although it is assumed here that the CORESET has the same frequency position (the bandwidth and the center frequency) as that of the SS block, the frequency position (the bandwidth and/or the center frequency) of the SS block may be different.

Out of the slot period, a period during which the SS block is not transmitted (time resource) may also be referred to as "empty period".

In the CORESET mapping type 1 of the TDM, each CORESET is arranged ahead of the corresponding SS block (at the head of the empty period immediately before the corresponding SS block).

For example, as illustrated in FIG. 9A, the CORESET #0 is arranged in the head symbol #0 of the symbols #0 and #1 (empty period) ahead of the corresponding SS block #0, and the CORESET #1 is arranged in the head symbol #6 of the symbols #6 and #7 (empty period) ahead of the corresponding SS block #1.

In the CORESET mapping type 2 of the TDM, each CORESET is arranged sequentially from the head of the slot (from the head of the first empty period).

For example, as illustrated in FIG. 9B, the CORESET #0 is arranged in the head symbol #0 of the slot, and the CORESET #1 is arranged in the next symbol #1.

In the CORESET mapping type 3 of the TDM, each CORESET is arranged sequentially from the tail of the SS block #0 (from the head of the second empty period).

For example, as illustrated in FIG. 9C, the CORESET #0 is arranged in the symbol #6 at the tail of the SS block #0, and the CORESET #1 is arranged in the next symbol #7.

For FDM and/or TDM, a plurality of CORESET mapping types may be defined in the specification. The UE may determine one of the CORESET mapping types exhibited in the field of the RMSI CORESET configuration table or may determine one of the CORESET mapping types on the basis of a parameter based on the indication information, the RMSI CORESET configuration bit information, and the RMSI CORESET configuration table and a predetermined formula.

Since the RMSI CORESET configuration table contains information indicating the FDM and/or TDM mapping type, it is possible to more flexibly configure the RMSI CORESET even when the length of the RMSI CORESET configuration bit information is limited.

Note that one of the FDM and/or TDM mapping types may be defined in the specification.

(Radio Communication System)

A configuration of a radio communication system according to an embodiment of the invention will now be described. In this radio communication system, communication is performed using any one of the radio communication methods according to each embodiment of the invention or a combination thereof.

Figure 10:
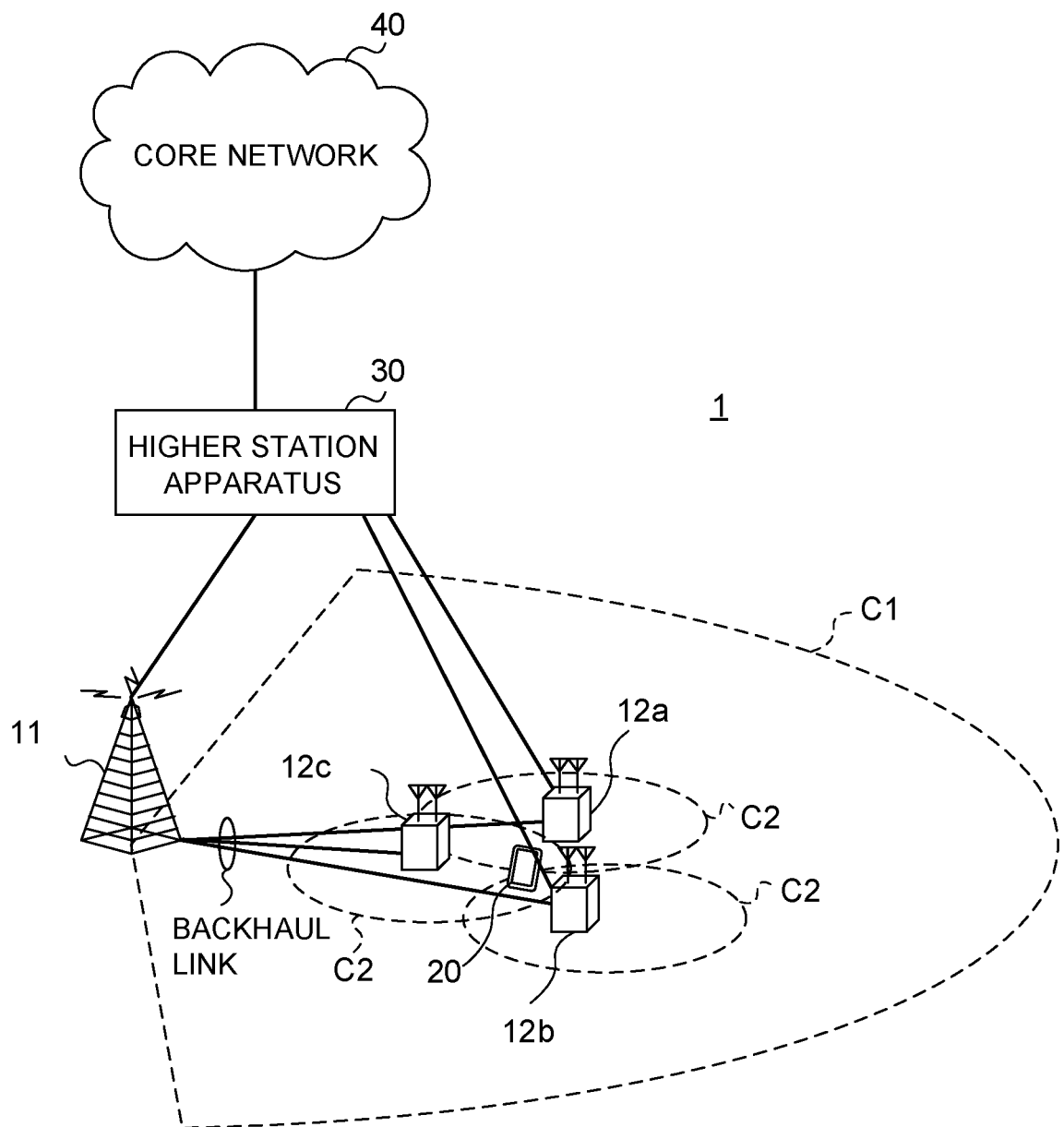
FIG. 10 is a diagram illustrating an exemplary schematic configuration of a radio communication system according to an embodiment of the invention.

FIG. 10 is a diagram illustrating an exemplary schematic configuration of the radio communication system according to an embodiment of the invention. In the radio communication system 1, carrier aggregation (CA) and/or dual connectivity (DC) is applicable, in which a plurality of fundamental frequency blocks (component carriers) are integrated by using a system bandwidth (for example, 20 MHz) of the LTE system as one unit.

Note that the radio communication system 1 may be referred to as LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), NR (New Radio), FRA (Future Radio Access), New-RAT (Radio Access Technology), or the like, or may also be referred to as a system that implements those technologies.

The radio communication system 1 has a radio base station 11 that forms a macro cell C1 having a relatively wider coverage and radio base stations 12 (12a to 12c) arranged in the macro cell C1 to form a small cell C2 having a coverage narrower than the macro cell C1. In addition, the user terminal 20 is arranged in the macro cell C1 and each small cell C2. The arrangement, the number, and the like of each cell and the user terminal 20 are not limited to those illustrated in the drawings.

The user terminal 20 is connectable to both the radio base stations 11 and 12. It is assumed that the user terminal 20 is used in both the macro cell C1 and the small cell C2 using the CA or DC technology. In addition, the user terminal 20 may apply the CA or DC technology using a plurality of cells CC (for example, five CCs or smaller or six CCs or larger).

Between the user terminal 20 and the radio base station 11, communication can be performed using a narrow bandwidth carrier (also referred to as an existing carrier or a legacy carrier) at a relatively low frequency band (for example, 2 GHz). Meanwhile, between the user terminal 20 and the radio base station 12, a wide bandwidth carrier may be used at a relatively higher frequency band (such as 3.5 GHz or 5 GHz), or a carrier similar to that used for communication with the radio base station 11 may also be used. Note that the configuration of the frequency band used by each radio base station is not limited thereto.

Between the radio base stations 11 and 12 (or between two radio base stations 12), wired connection (such as fiber optics based on common public radio interface (CPRI) or X2 interface) or wireless connection may be established.

Each of the radio base stations 11 and 12 is connected to an higher layer station apparatus 30, and is connected to a core network 40 via the higher layer station apparatus 30. Note that the higher layer station apparatus 30 may include, for example, an access gateway apparatus, a radio network controller (RNC), a mobility management entity (MME), or the like, but not limited thereto. In addition, each radio base station 12 may be connected to the higher layer station apparatus 30 via the radio base station 11.

Note that the radio base station 11 is a radio base station having a relatively wide coverage, and may also be referred to as "macro base station", "integrated node", "eNB (eNodeB)", "transmitting/receiving point", or the like. In addition, the radio base station 12 is a radio base station having a local coverage, and may also be referred to as "small base station", "micro base station", "pico base station", "femto base station", "Home eNodeB (HeNB)", "remote radio head (RRH)", "transmitting/receiving point", or the like. Unless distinguished separately, the radio base stations 11 and 12 will be collectively referred to as "radio base station 10".

Each user terminal 20 is a terminal conformable to various communication types such as LTE or LTE-A, and may also include a fixed communication terminal (fixed station) as well as a mobile communication terminal (mobile station).

As the radio access scheme of the radio communication system 1, orthogonal frequency division multiple access (OFDMA) is applied to the downlink, and single carrier frequency division multiple access (SC-FDMA) and/or OFDMA is applied to the uplink.

The OFDMA is a multi-carrier transmission scheme for performing communication by dividing a frequency band into a plurality of narrow frequency bands (subcarriers) and mapping data to each subcarrier. The SC-FDMA is a single carrier transmission scheme to reduce interference between terminals by dividing, per terminal, the system bandwidth into bands formed with one or continuous resource blocks and allowing a plurality of terminals to use different bands. Note that the uplink and downlink radio access schemes are not limited to such a combination, and other radio access schemes may also be employed.

As the downlink channel of the radio communication system 1, a downlink shared channel (PDSCH: Physical Downlink Shared Channel) that is used by each user terminal 20 on a shared basis, a broadcast channel (PBCH: Physical Broadcast channel), and a downlink L1/L2 control channel, or the like are employed. The PDSCH is used to transmit user data, higher layer control information, a system information block (SIB), and the like. In addition, the PBCH is used to transmit a master information block (MIB).

The downlink L1/L2 control channel includes a physical downlink control channel (PDCCH), an enhanced physical downlink control channel (EPDCCH), a physical control format indicator channel (PCFICH), and a physical hybrid-ARQ indicator channel (PHICH), or the like. The PDCCH is used to transmit downlink control information (DCI), including PDSCH and/or PUSCH scheduling information, or the like.

Note that the DCI may be used to notify scheduling information. For example, the DCI used to schedule the DL data receiving may also be referred to as "DL assignment", and the DCI used to schedule the UL data transmission may also be referred to as "UL grant".

The PCFICH is used to transmit the number of OFDM symbols used in the PDCCH. The PHICH is used to transmit hybrid automatic repeat request (HARQ) transmission acknowledgement information for the PUSCH (for example, also referred to as "retransmission control information", "HARQ-ACK", "ACK/NACK", or the like). The EPDCCH is frequency-division-multiplexed with a downlink shared data channel (PDSCH) and is used for transmitting the DCI or the like, similar to the PDCCH.

As the uplink channel of the radio communication system 1, an uplink shared channel (PUSCH: Physical Uplink Shared Channel) that is used by each user terminal 20 on a shared basis, an uplink control channel (PUCCH: Physical Uplink Control Channel), a random access channel (PRACH: Physical Random Access Channel), or the like is employed. The PUSCH is used to transmit user data, higher layer control information, and the like. In addition, the PUCCH is used to transmit radio quality information (CQI: Channel Quality Indicator) of the downlink, transmission acknowledgement information, scheduling request (SR), and the like. The PRACH is used to transmit a random access preamble for establishing connection to a cell.

As the downlink reference signal of the radio communication system 1, a cell specific reference signal (CRS), a channel state information reference signal (CSI-RS), a demodulation reference signal (DMRS), a positioning reference signal (PRS), or the like is transmitted. In addition, as the uplink reference signal of the radio communication system 1, a sounding reference signal (SRS), a demodulation reference signal (DMRS), or the like is transmitted. Note that the DMRS may also be referred to as "UE-specific reference signal". Furthermore, the transmitted reference signals are not limited thereto.

<Radio Base Station>

Figure 11:
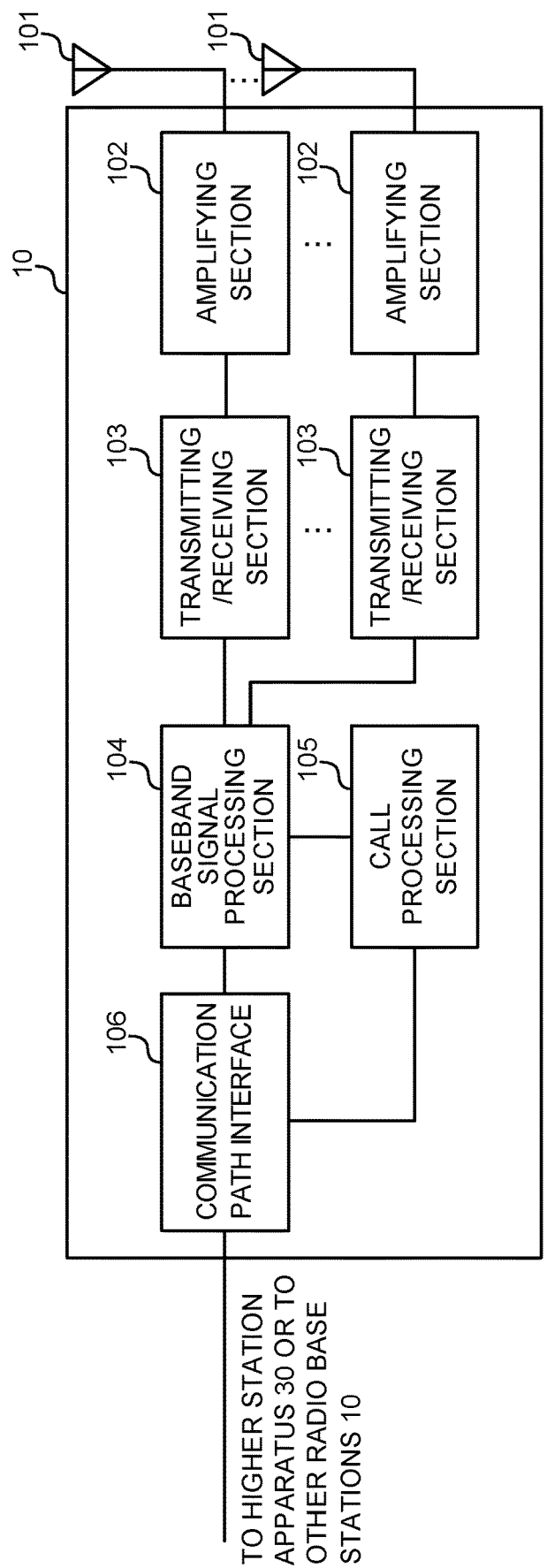
FIG. 11 is a diagram illustrating an exemplary complete configuration of a radio base station according to an embodiment of the invention.

FIG. 11 is a diagram illustrating a complete configuration of the radio base station according to an embodiment of the invention. The radio base station 10 includes a plurality of transmitting/receiving antennas 101, an amplifying unit 102, a transmitting/receiving unit 103, a baseband signal processing unit 104, a call processing unit 105, and a transmission path interface 106. Note that one or more transmitting/receiving antennas 101, one or more amplifying units 102, and one or more transmitting/receiving units 103 may be provided.

User data transmitted on the downlink from the radio base station 10 to the user terminal 20 is input from the higher layer station apparatus 30 to the baseband signal processing unit 104 via the transmission path interface 106.

In the baseband signal processing unit 104, the user data is subjected to transmission processing such as packet data convergence protocol (PDCP) layer processing, dividing/combining of user data, radio link control (RLC) layer transmission processing such as RLC retransmission control, medium access control (MAC) retransmission control (such as HARQ transmission processing), scheduling, transport format selection, channel coding, inverse fast Fourier transform (IFFT) processing, and precoding processing, and a resultant signal is transmitted to the transmitting/receiving unit 103. In addition, the downlink control signal is also subjected to transmission processing such as channel coding and inverse fast Fourier transform, and a resultant signal is also transmitted to the transmitting/receiving unit 103.

The transmitting/receiving unit 103 converts the baseband signal precoded per each antenna and output from the baseband signal processing unit 104 into a radio frequency band and transmits the radio frequency band. The radio frequency signal subjected to frequency conversion in the transmitting/receiving unit 103 is amplified by the amplifying unit 102 and is transmitted from the transmitting/receiving antenna 101. The transmitting/receiving unit 103 may include a transmitter/receiver, a transmitting/receiving circuit, or a transmitting/receiving apparatus as explained on the basis of common knowledge in the technical field to which the present invention pertains. Note that the transmitting/receiving unit 103 may include an integrated transmitting/receiving unit or may separately include a transmitting unit and a receiving unit.

Meanwhile, for the uplink signal, a radio frequency signal received by the transmitting/receiving antenna 101 is amplified by the amplifying unit 102. The transmitting/receiving unit 103 receives the uplink signal amplified by the amplifying unit 102. The transmitting/receiving unit 103 frequency-converts the received signal into a baseband signal and outputs the baseband signal to the baseband signal processing unit 104.

The baseband signal processing unit 104 performs fast Fourier transform (FFT) processing, inverse discrete Fourier transform (IDFT) processing, error correction decoding, MAC retransmission control receiving processing, and RLC layer and PDCP layer receiving processing for the user data included in the input uplink signal and transmits the resultant signal to the higher layer station apparatus 30 via the transmission path interface 106. The call processing unit 105 performs call processing (such as call configuration and releasing) for a communication channel, state management of the radio base station 10, management of the radio resources, and the like.

The transmission path interface 106 transmits or receives signals to/from the higher layer station apparatus 30 via a predetermined interface. In addition, the transmission path interface 106 may transmit or receives signals (backhaul signaling) to/from other radio base stations 10 via an inter-base-station interface (such as optical fiber or X2 interface compliant with the common public radio interface (CPRI)).

The transmitting/receiving unit 103 may transmit a synchronization signal block (such as the SS block and the SS/PBCH block) including bit information (such as RMSI CORESET configuration bit information) regarding the configuration of the control resource set (such as RMSI CORESET).

Figure 12:
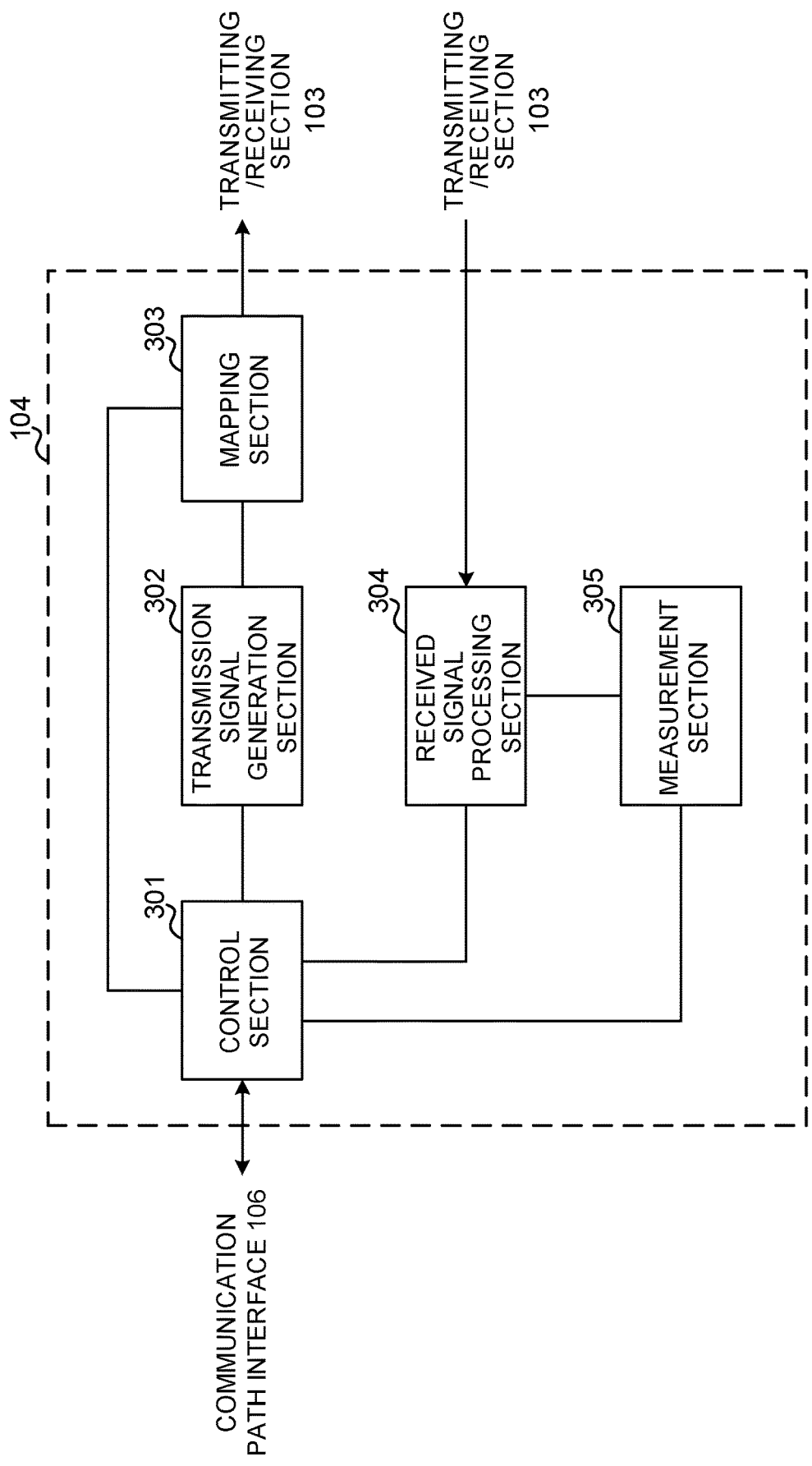
FIG. 12 is a diagram illustrating an exemplary functional configuration of a radio base station according to an embodiment of the invention.

FIG. 12 is a diagram illustrating an exemplary functional configuration of the radio base station according to an embodiment of the invention. Note that, although functional blocks of characteristic parts of this embodiment are mainly illustrated in this example, the radio base station 10 may include other functional blocks necessary for radio communication.

The baseband signal processing unit 104 at least includes a control unit (scheduler) 301, a transmitting signal generating unit 302, a mapping unit 303, a receiving signal processing unit 304, and a measurement unit 305. Note that a part or all of such components may not be included in the baseband signal processing unit 104 as long as they are included in the radio base station 10.

The control unit (scheduler) 301 controls the radio base station 10 as a whole. The control unit 301 may include a controller, a control circuit, or a control apparatus as explained on the basis of common knowledge in the technical field to which the present invention pertains.

The control unit 301 controls, for example, generation of signals using the transmitting signal generating unit 302, allocation of signals using the mapping unit 303, and the like. In addition, the control unit 301 controls signal receiving processing of the receiving signal processing unit 304, measurement of signals using the measurement unit 305, and the like.

The control unit 301 controls scheduling (such as resource allocation) of system information, a downlink data signal (such as a signal transmitted via PDSCH) and a downlink control signal (such as a signal transmitted via PDCCH and/or EPDCCH or transmission acknowledgement information). In addition, the control unit 301 controls generation of a downlink control signal, a downlink data signal, and the like on the basis of a result of determination on whether or not retransmission control is necessary for the uplink data signal or the like. Furthermore, the control unit 301 controls scheduling of a synchronization signal (such as PSS/SSS (Primary Synchronization Signal/Secondary Synchronization Signal)), the downlink reference signal (such as CRS, CSI-RS, and DMRS), and the like.

The control unit 301 controls scheduling of an uplink data signal (such as a signal transmitted via PUSCH), an uplink control signal (such as a signal transmitted via PUCCH and/or PUSCH or transmission acknowledgement information), a random access preamble (such as a signal transmitted via PRACH), an uplink reference signal, and the like.

The transmitting signal generating unit 302 generates a downlink signal (such as a downlink control signal, a downlink data signal, and a downlink reference signal) on the basis of an indication from the control unit 301 and outputs the downlink signal to the mapping unit 303. The transmitting signal generating unit 302 may include a signal generator, a signal generating circuit, or a signal generating apparatus as explained on the basis of common knowledge in the technical field to which the present invention pertains.

The transmitting signal generating unit 302 generates DL assignment for notifying downlink data allocation information and/or UL grant for notifying uplink data allocation information, for example, on the basis of an indication from the control unit 301. Both the DL assignment and the UL grant are Das compliant with the DCI format. In addition, the downlink data signal is subjected to coding processing and modulation processing depending on a coding rate, a modulation scheme, and the like determined on the basis of channel state information (CSI) or the like from each user terminal 20.

The mapping unit 303 maps a downlink signal generated by the transmitting signal generating unit 302 to a predetermined radio resource on the basis of an indication from the control unit 301 and outputs it to the transmitting/receiving unit 103. The mapping unit 303 may include a mapper, a mapping circuit, or a mapping apparatus as explained on the basis of common knowledge in the technical field to which the present invention pertains.

The receiving signal processing unit 304 performs receiving processing (such as de-mapping, demodulation, and decoding) for the receiving signal input from the transmitting/receiving unit 103. Here, the receiving signal includes an uplink signal (such as an uplink control signal, an uplink data signal, and an uplink reference signal) transmitted from the user terminal 20. The receiving signal processing unit 304 may include a signal processor, a signal processing circuit, or a signal processing apparatus as explained on the basis of common knowledge in the technical field to which the present invention pertains.

The receiving signal processing unit 304 outputs the information decoded through the receiving processing to the control unit 301. For example, when the PUCCH including the HARQ-ACK is received, the HARQ-ACK is output to the control unit 301. In addition, the receiving signal processing unit 304 outputs the received signal and/or the signal subjected to the receiving processing to the measurement unit 305.

The measurement unit 305 performs measurement for the received signal. The measurement unit 305 may include a measurement meter, a measurement circuit, or a measurement apparatus as explained on the basis of common knowledge in the technical field to which the present invention pertains.

For example, the measurement unit 305 may perform radio resource management (RRM) measurement, channel state information (CSI) measurement, or the like on the basis of the received signal. The measurement unit 305 may measure received power (such as reference signal received power (RSRP)), received quality (such as a reference signal received quality (RSRQ) and a signal to interference plus noise ratio (SINR)), a signal intensity (such as received signal strength indicator (RSSI)), transmission path information (such as CSI), or the like. The measurement result may be output to the control unit 301.

<User terminal>

Figure 13:
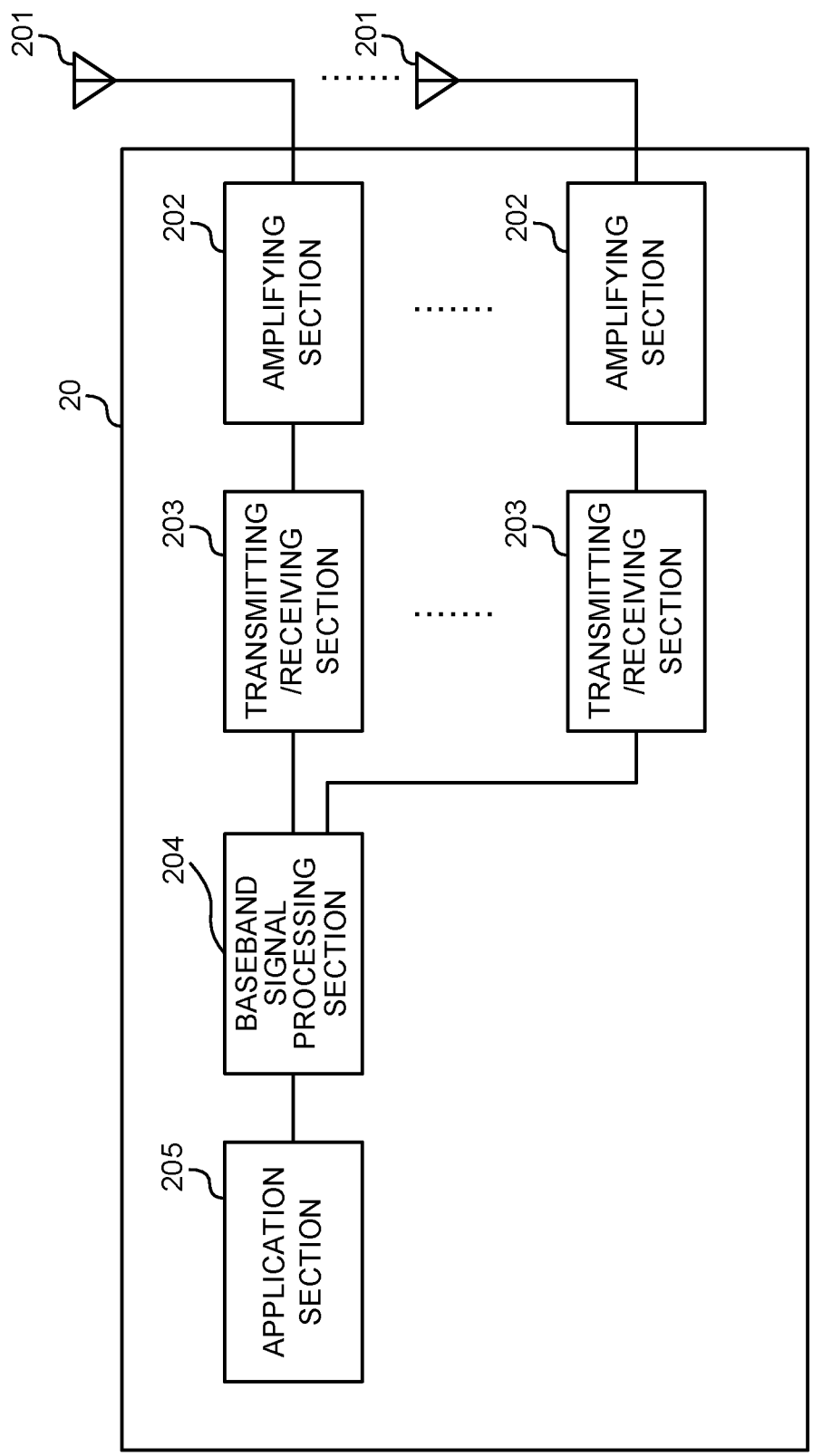
FIG. 13 is a diagram illustrating an exemplary complete configuration of a user terminal according to an embodiment of the invention.

FIG. 13 is a diagram illustrating an exemplary complete configuration of the user terminal according to an embodiment of the invention. The user terminal 20 includes a plurality of transmitting/receiving antennas 201, an amplifying unit 202, a transmitting/receiving unit 203, a baseband signal processing unit 204, and an application unit 205. Note that one or more transmitting/receiving antennas 201, one or more amplifying units 202, and one or more transmitting/receiving units 203 may be provided.

A radio frequency signal received via the transmitting/receiving antenna 201 is amplified by the amplifying unit 202. The transmitting/receiving unit 203 receives the downlink signal amplified by the amplifying unit 202. The transmitting/receiving unit 203 frequency-converts the received signal into a baseband signal and outputs the baseband signal to the baseband signal processing unit 204. The transmitting/receiving unit 203 may include a transmitter/receiver, a transmitting/receiving circuit, or a transmitting/receiving apparatus as explained on the basis of common knowledge in the technical field to which the present invention pertains. Note that the transmitting/receiving unit 203 may include an integrated transmitting/receiving unit or may separately include a transmitting unit and a receiving unit.

The baseband signal processing unit 204 performs receiving processing such as FFT processing, error correction decoding, retransmission control for the input baseband signal, or the like. The downlink user data is transmitted to the application unit 205. The application unit 205 performs processing for layers higher than the physical layer and the MAC layer, and the like. In addition, out of the downlink data, the broadcast information may be transmitted to the application unit 205.

Meanwhile, the uplink user data is input from the application unit 205 to the baseband signal processing unit 204. The baseband signal processing unit 204 performs transmission processing of the retransmission control (such as HARQ transmission processing), channel coding, precoding, discrete Fourier transform (DFT) processing, IFFT processing, or the like and transmits the resultant signal to the transmitting/receiving unit 203. The transmitting/receiving unit 203 converts the baseband signal output from the baseband signal processing unit 204 into a radio frequency band and transmits the radio frequency signal. The radio frequency signal converted by the transmitting/receiving unit 203 is amplified by the amplifying unit 202 and is transmitted from the transmitting/receiving antenna 201.

The transmitting/receiving unit 203 may receive a synchronization signal block (such as an SS block or an SS/PBCH block) including bit information (such as RMSI CORESET configuration bit information) regarding a configuration of the control resource set (such as RMSI CORESET).

Figure 14:
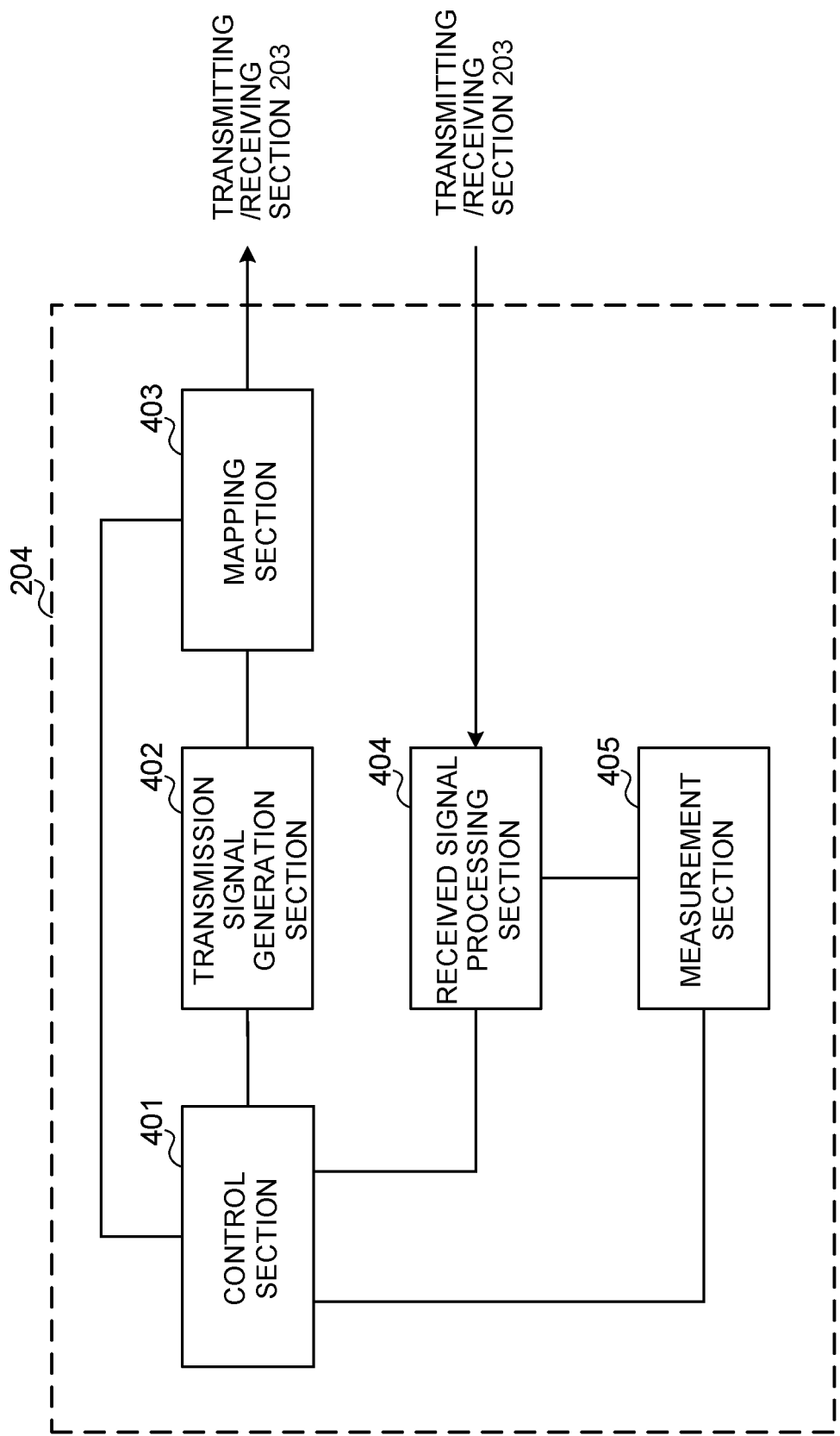
FIG. 14 is a diagram illustrating an exemplary functional configuration of a user terminal according to an embodiment of the invention.

FIG. 14 is a diagram illustrating an exemplary functional configuration of the user terminal according to an embodiment of the invention. Note that, although functional blocks of characteristic parts according to this embodiment are mainly illustrated, the user terminal 20 may include other functional blocks necessary for radio communication.

The baseband signal processing unit 204 of the user terminal 20 at least includes a control unit 401, a transmitting signal generating unit 402, a mapping unit 403, a receiving signal processing unit 404, and a measurement unit 405. Note that a part or all of such components may not be included in the baseband signal processing unit 204 as long as they are included in the user terminal 20.

The control unit 401 controls the user terminal 20 as a whole. The control unit 401 may include a controller, a control circuit, or a control apparatus as explained on the basis of common knowledge in the technical field to which the present invention pertains.

The control unit 401 controls, for example, generation of signals using the transmitting signal generating unit 402, allocation of signals using the mapping unit 403, and the like. In addition, the control unit 401 controls signal receiving processing of the receiving signal processing unit 404, measurement of signals using the measurement unit 405, and the like.

The control unit 401 acquires the downlink control signal and the downlink data signal transmitted from the radio base station 10 from the receiving signal processing unit 404. The control unit 401 controls generation of the uplink control signal and/or the uplink data signal on the basis of a determination result on whether or not retransmission control is necessary for the downlink control signal and/or the downlink data signal, or the like.

When various pieces of information notified from the radio base station 10 are acquired from the receiving signal processing unit 404, the control unit 401 may update a parameter used in the control on the basis of such information.

The transmitting signal generating unit 402 generates an uplink signal (such as an uplink control signal, an uplink data signal, and an uplink reference signal) on the basis of an indication from the control unit 401 and outputs the uplink signal to the mapping unit 403. The transmitting signal generating unit 402 may include a signal generator, a signal generating circuit, or a signal generating apparatus as explained on the basis of common knowledge in the technical field to which the present invention pertains.

The transmitting signal generating unit 402 generates the uplink control signal regarding transmission acknowledgement information, channel state information (CSI), or the like, for example, on the basis of an indication from the control unit 401. In addition, the transmitting signal generating unit 402 generates the uplink data signal on the basis of an indication from the control unit 401. For example, the transmitting signal generating unit 402 is indicated of the uplink data signal generation from the control unit 401 when the downlink control signal notified from the radio base station 10 includes the UL grant.

The mapping unit 403 maps the uplink signal generated by the transmitting signal generating unit 402 to a radio resource on the basis of the indication from the control unit 401 and outputs it to the transmitting/receiving unit 203. The mapping unit 403 may include a mapper, a mapping circuit, or a mapping apparatus as explained on the basis of common knowledge in the technical field to which the present invention pertains.

The receiving signal processing unit 404 performs receiving processing (such as de-mapping, demodulation, and decoding) for the receiving signal input from the transmitting/receiving unit 203. Here, the receiving signal includes a downlink signal (such as a downlink control signal, a downlink data signal, and a downlink reference signal) transmitted from the radio base station 10. The receiving signal processing unit 404 may include a signal processor, a signal processing circuit, or a signal processing apparatus as explained on the basis of common knowledge in the technical field to which the present invention pertains. In addition, the receiving signal processing unit 404 may be configured as a receiving unit according to the present invention.

The receiving signal processing unit 404 outputs the information decoded through the receiving processing to the control unit 401. The receiving signal processing unit 404 outputs, for example, broadcast information, system information, RRC signaling, DCI, or the like to the control unit 401. In addition, the receiving signal processing unit 404 outputs the received signal and/or the signal subjected to the receiving processing to the measurement unit 405.

The measurement unit 405 performs measurement for the received signal. The measurement unit 405 may include a measurement meter, a measurement circuit, or a measurement apparatus as explained on the basis of common knowledge in the technical field to which the present invention pertains.

For example, the measurement unit 405 may perform RRM measurement, CSI measurement, or the like on the basis of the received signal. The measurement unit 405 may measure received power (such as RSRP), received quality (such as RSRQ and SINR), a signal intensity (such as RSSI), transmission path information (such as CSI), or the like. The measurement result may be output to the control unit 401.

The control unit 401 may control determination on the configuration of the control resource set (such as RMSI CORESET) on the basis of configuration information (such as entries) associated with bit information (such as RMSI CORESET configuration bit information) out of the configuration information set (such as the RMSI CORESET configuration table) associated with indication information based on receiving (for example, receiving of the SS block).

The indication information may include one of the frequency band and the numerology (such as the sub-carrier spacing) of the synchronization signal block and/or the control resource set.

The control unit 401 may determine whether or not there is a synchronization signal block transmitted in practice on the basis of the aforementioned configuration information.

The configuration information set is one of a plurality of configuration information sets configured in advance and may include a plurality of configuration information pieces respectively associated with a plurality of values of the bit information.

Each of the plurality of configuration information sets may include at least one of a relative position of the control resource set (such as a time position and/or frequency position and a CORESET mapping type) with respect to the synchronization signal block, mapping of the data demodulation reference signal (such as a DMRS mapping type) for the control resource set, a multiplexing scheme of the synchronization signal block and the control resource set, and a pattern for designating at least one combination between the relative position, the mapping, and the multiplexing scheme (such as RMSI CORESET configuration bit information).

<Hardware Configuration>

Note that the block diagrams used in description of the aforementioned embodiments illustrate blocks in the unit of function. Such functional blocks (components) are implemented by arbitrarily combining hardware and/or software. In addition, the method of implementing each functional block is not particularly limited. That is, each functional block may be implemented using a single apparatus combined physically and/or logically or using a plurality of apparatuses by directly and/or indirectly connecting two or more apparatuses physically and/or logically separated (for example, in a wired and/or wireless manner).

Figure 15:
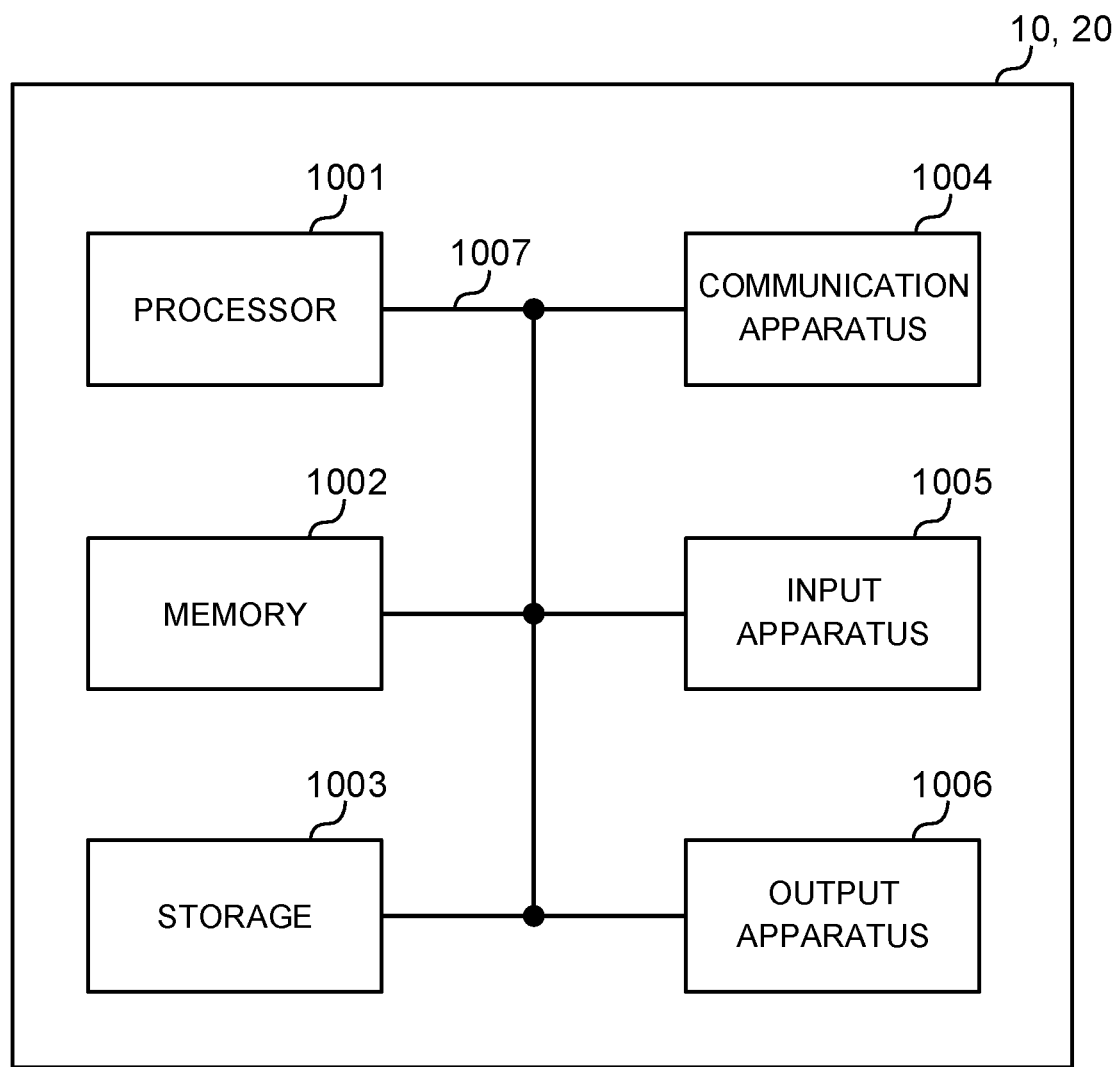
FIG. 15 is a diagram illustrating exemplary hardware configurations of the radio base station and the user terminal according to an embodiment of the invention.

For example, the radio base station and the user terminal according to an embodiment of the present invention may function as a computer that performs processing of the radio communication method of the present invention. FIG. 15 is a diagram illustrating exemplary hardware configurations of the radio base station and the user terminal according to an embodiment of the present invention. The aforementioned radio base station 10 and the user terminal 20 may physically include a computer apparatus having a processor 1001, a memory 1002, a storage 1003, a communication apparatus 1004, an input apparatus 1005, an output apparatus 1006, a bus 1007, or the like.

Note that, in the following description, the word "apparatus" may be replaced with "circuit", "device", "unit", or the like. The hardware configurations of the radio base station 10 and the user terminal 20 may include one or a plurality of apparatuses illustrated in the drawings or may not include a part of the apparatuses.

For example, although only one processor 1001 is illustrated, a plurality of processors may also be provided. In addition, the processing may be executed by a single processor or may be executed by one or more processors simultaneously or sequentially using other methods. Note that the processor 1001 may be embedded in one or more chips.

Each function of the radio base station 10 and the user terminal 20 is implemented by reading predetermined software (program) to hardware of the processor 1001, the memory 1002, or the like, performing operation using the processor 1001, and controlling communication via the communication apparatus 1004 and data reading and/or writing of the memory 1002 and storage 1003.

For example, the processor 1001 controls the computer as a whole by operating an operating system. The processor 1001 may also include a central processing unit (CPU) having an interface with a peripheral device, a control apparatus, an operating apparatus, a register, and the like. For example, the aforementioned baseband signal processing unit 104 (204), the call processing unit 105, or the like may be implemented by the processor 1001.

The processor 1001 reads programs (program codes), software module, data, or the like from the storage 1003 and/or the communication apparatus 1004 to the memory 1002 and uses them as a basis to execute various processings. The program causes a computer to execute at least a part of the operations described in the aforementioned embodiments. For example, the control unit 401 of the user terminal 20 may be implemented by a control program stored in the memory 1002 and operated in the processor 1001, or may be implemented by other functional blocks in a similar manner.

The memory 1002 is a computer readable recoding medium, and, for example, may include at least one of a read only memory (ROM), an erasable programmable ROM (EPROM), an electrically EPROM (EEPROM), a random access memory (RAM), and the like. The memory 1002 may also be referred to as "register", "cache", "main memory (main storage device)", or the like. The memory 1002 may store programs (program codes), software modules, and the like to implement the radio communication method according to an embodiment of the invention.

The storage 1003 is a computer readable recording medium and may include at least one of a flexible disc, a Floppy® disc, a magnetic optical disk (such as compact disc ROM (CD-ROM), a digital multi-purpose disc, and a Blu-ray® disc), a removable disc, a hard disk drive, a smart card, a flash memory device (such as a card, a stick, and a key drive), a magnetic stripe, a database, a server, or other suitable storage media. The storage 1003 may also be referred to as "auxiliary storage device".

The communication apparatus 1004 is hardware (transmitting/receiving device) for performing communication between computers via wire and/or wireless networks and may also be referred to as "network device", "network controller", "network card", "communication module", or the like. The communication apparatus 1004 may also include a high-frequency switch, a duplexer, a filter, a frequency synthesizer, or the like in order to implement, for example, frequency division duplex (FDD) and/or time division duplex (TDD) communication. For example, the transmitting/receiving antenna 101 (or 201), the amplifying unit 102 (or 202), the transmitting/receiving unit 103 (or 203), the transmission path interface 106, and the like described above may be implemented by the communication apparatus 1004.

The input apparatus 1005 is an input device that receives an input from the outside (such as a keyboard, a mouse, a microphone, a switch, a button, and a sensor). The output apparatus 1006 is an output device (such as a display, a speaker, and a light emitting diode (LED) lamp) for outputting information to the outside. Note that the input apparatus 1005 and the output apparatus 1006 may be integrated with each other (for example, a touch panel).

Various apparatuses such as the processor 1001 and the memory 1002 are connected via a bus 1007 for information communication. The bus 1007 may include a single bus, or different buses may be used for each apparatus.

The radio base station 10 and the user terminal 20 may include hardware such as a micro processor, a digital signal processor (DSP), an application specific integrated circuit (ASIC), a programmable logic device (PLD), and a field programmable gate array (FPGA). In addition, the hardware may be used to implement a part or all of the functional blocks. For example, the processor 1001 may be embedded with at least one of such hardware units.

Modifications

Note that technical terminologies discussed herein and/or technical terminologies necessary for understanding this specification may be substituted with other technical terminologies having the same or similar meanings. For example, channels and/or symbols may be substituted with signals (signaling). Furthermore, signals may be substituted with messages. In addition, the reference signal may be abbreviated to "RS", and may also be referred to as "pilot", "pilot signal", or the like depending on the applied standard. Furthermore, the component carrier (CC) may also be referred to as "cell", "frequency carrier", "carrier frequency", or the like.

The radio frame may include one or a plurality of periods (frames) in the time domain. The one or a plurality of periods (frames) of the radio frame may also be referred to as "subframe". In addition, the subframe may include one or a plurality of slots in the time domain. Furthermore, the subframe may have a fixed time length (for example, 1 ms) regardless of the numerology.

The slot may include one or a plurality of symbols (such as orthogonal frequency division multiplexing (OFDM) symbols or single carrier frequency division multiple access (SC-FDMA) symbols) in the time domain. In addition, the slot may be a time unit based on the numerology. Furthermore, the slot may include a plurality of mini-slots. Each mini-slot may include one or a plurality of symbols in the time domain. Moreover, the mini-slot may also be referred to as "sub-slot".

All of the radio frame, the subframe, the slot, the mini-slot, and the symbol represent a time unit for signal transmission. Each of the radio frame, the subframe, the slot, the mini-slot, and the symbol may be called different names. For example, one subframe may be referred to as "transmission time interval (TTI)", or a plurality of continuous subframes may be referred to as "TTI". In addition, one slot or one mini-slot may be referred to as "TTI". That is, the subframe and/or the TTI may be a subframe (1 ms) in the existing LTE, may be shorter than 1 ms (for example, 1 to 13 symbols), or may be longer than 1 ms. Note that the unit of the TTI may also be referred to as "slot", "mini-slot", or the like instead of the subframe.

Here, the TTI refers to a minimum time unit for scheduling in radio communication. For example, in the LTE system, the scheduling is performed such that the radio base station allocates radio resources (such as a frequency bandwidth and a transmission power available for each user terminal) to each user terminal on a TTI basis. The definition of "TTI" is not limited thereto.

The TTI may be a transmission time unit of channel-coded data packets (transport blocks), code blocks, and/or codewords or may be a processing unit of scheduling, link adaptation, or the like. Note that, when the TTI is given, a time interval (for example, the number of symbols) during which transport blocks, code blocks, and/or codewords are mapped in practice may be shorter than the TTI.

Note that, when one slot or one mini-slot is referred to as "TTI", one or more TTIs (that is, one or more slots or one or more mini-slots) may be the minimum time unit of the scheduling. In addition, the number of the slots (mini-slots) included in the minimum time unit of the scheduling may also be controlled.

The TTI having a time length of "1 ms" may also be referred to as "typical TTI (TTI of LTE Rel. 8 to 12), "normal TTI", "long TTI", "typical subframe", "normal subframe", "long subframe", or the like. The TTI shorter than the typical TTI may also be referred to as "reduced TTI", "short TTI", "partial TTI", "fractional TTI", "reduced subframe", "short subframe", "mini-slot", "sub-slot", or the like.

Note that the long TTI (such as the typical TTI or subframe) may also be referred to as "TTI having a time length exceeding 1 ms", and the short TTI (such as the reduced TTI) may also be referred to as "TTI having a TTI length shorter than that of the long TTI and having a TTI length of 1 ms or longer".

The resource block (RB) is a resource allocation unit in the time domain and the frequency domain and may include one or a plurality of continuous subcarriers in the frequency domain. In addition, the RB may include one or a plurality of symbols in the time domain and may be one slot, one mini-slot, one subframe, or one TTI length. One TTI and one subframe may include one or a plurality of resource blocks. The one or the plurality of RBs may also be referred to as "physical resource block (PRB: Physical RB)", "sub-carrier group (SCG)", "resource element group (REG)", "PRB pair", "RB pair", or the like.

The resource block may include one or a plurality of resource elements (REs). For example, one RE may include a radio resource region of one subcarrier and one symbol.

The structures of the radio frame, the subframe, the slot, the mini-slot, the symbol, and the like are merely given by way of example. For example, the number of subframes included in a radio frame, the number of slots included in a subframe or radio frame, the number of mini-slots included in a slot, the numbers of symbols and RBs included in a slot or mini-slot, the number of subcarriers included in an RB, the number of symbols in a TTI, a symbol length, a cyclic prefix (CP) length, and the like may change variously.

The information, parameters, or the like discussed herein may be expressed as absolute values or as relative values with respect to a predetermined value, or may be expressed as other corresponding information. For example, the radio resource may be indicated by a predetermined index.

The names used for parameters herein are not to be construed as a limitative sense. For example, since all of various channels (such as the physical uplink control channel (PUCCH) and the physical downlink control channel (PDCCH)) and information factors can be identified using suitable names, various names designated to various channels and information factors are not to be construed as a limitative sense in any point.

Information, signals, or the like discussed herein may be expressed as any one of various different technologies. For example, data, instructions, commands, information, signals, bits, symbols, chips, or the like described throughout the aforementioned description may be expressed as voltages, currents, electromagnetic waves, magnetic fields or magnetic particles, optical fields or photons, or any combination thereof.

Information, signals, or the like may be output from the higher layer to the lower layer and/or from the lower layer to the higher layer. Information, signals, or the like may be input/output via a plurality of network nodes.

The input/output information, signals, or the like may be stored in a particular place (such as a memory) or may be managed using a management table. The input/output information, signals, or the like may be overwritten, updated, or added. The information, signals, or the like that have been output may be deleted. The input information, signals, or the like may be transmitted to other apparatuses.

Notification of information may be performed using other methods without limiting to the aspects/embodiments described herein. For example, notification of information may be performed using physical layer signaling (such as downlink control information (DCI) and uplink control information (UCI)), higher layer signaling (such as radio resource control (RRC) signaling, broadcast information (such as master information block (MIB) and system information block (SIB)), medium access control (MAC) signaling), other signals, or any combination thereof.

Note that the physical layer signaling may also be referred to as "L1/L2 (Layer 1/Layer 2) control information (L1/L2 control signal)", "L1 control information (L1 control signal)", or the like. In addition, the RRC signaling may also be referred to as "RRC message", for example, "RRC connection setup message", "RRC connection reconfiguration message", or the like. Furthermore, the MAC signaling may be notified, for example, using a MAC control element (MAC CE).

Notification of predetermined information (for example, notification of "X") may be performed implicitly (for example, without performing notification of the predetermined information or by notifying other information) without limiting to explicit notification.

The determination may be performed using a value expressed in one bit ("0" or "1"), may be performed using a Boolean value expressed in "true" or "false", or may be performed by comparing numerical values (for example, comparison with a predetermined value).

It is natural to widely interpret "software" to include an instruction, an instruction set, a code, a code segment, a program code, a program, a subprogram, a software module, an application, a software application, a software package, a routine, a subroutine, an object, an executable file, an execution thread, a procedure, a function, and the like, regardless of whether the software is referred to as software, firmware, middleware, microcode, hardware description language, or other names.

Software, instructions, information, or the like may be transmitted or received via a transmission medium. For example, when the software is transmitted from a website, server, or another remote source in a wired manner (such as a coaxial cable, a fiber optic cable, a twisted pair, and a digital subscriber line (DSL)) and/or in wireless manner (such as infrared, radio, and microwave), these wired and/or wireless technologies are also incorporated into the definition of the transmission medium.

The words "system" and "network" as used herein are interchangeable.

Herein, the words "base station (BS)", "radio base station", "eNB", "gNB", "cell", "sector", "cell group", "carrier", and "component carrier" may be interchangeable. In some cases, the "base station" is also referred to as "fixed station", "NodeB", "eNodeB (eNB)", "access point", "transmitting point", "receiving point", "femto cell", "small cell", or the like.

A base station may accommodate one or more (for example, three) cells (also referred to as "sectors"). If the base station accommodates a plurality of cells, the whole coverage area of the base station may be segmented into multiple smaller areas, and the respective smaller areas may provide communication services with a base station subsystem (for example, an indoor small base station (RRH: Remote Radio Head)). The word "cell" or "sector" refers to a part or whole of the coverage area of the base station and/or the base station subsystem providing communication services in this coverage.

Herein, the words "mobile station (MS)", "user terminal", "user equipment (UE)", and "terminal" may be interchangeable. The "base station" may also be referred to as "fixed station", "NodeB", "eNodeB (eNB)", "access point", "transmitting point", "receiving point", "femto cell", "small cell", and the like.

In some cases, the "mobile station" may be referred to, by those skilled in the art, as "subscriber station", "mobile unit", "subscriber unit", "wireless unit", "remote unit", "mobile device", "wireless device", "wireless communication device", "remote device", "mobile subscriber station", "access terminal", "mobile terminal", "wireless terminal", "remote terminal", "handset", "user agent", "mobile client", "client", or any other appropriate terminologies.

The radio base station herein may also be referred to as "user terminal". For example, the aforementioned aspects/embodiments may be applied to a case where communication between the radio base station and the user terminal is substituted with communication between a plurality of user terminals (D2D: Device-to-Device). In this case, the aforementioned functions provided in the radio base station 10 may be included in the configuration of the user terminal 20.

In addition, the words "uplink" and "downlink" may also be referred to as "sides". For example, the uplink channel may also be referred to as "side channel".

Similarly, the "user terminal" herein may also be referred to as "radio base station". In this case, the aforementioned functions provided in the user terminal 20 may be included in the radio base station 10.

The operations performed by the base station as described herein may be performed by its upper node in some cases. In a network including one or a plurality of network nodes having base stations, it is apparent that various operations performed to communicate with a terminal may be performed by a base station, one or more network nodes other than the base station (such as "mobility management entity (MME)" or "serving-gateway (S-GW)", but not limited thereto), or a combination thereof.

Each of the aspects/embodiments described herein may be used solely, in combination, or switchably upon execution. In addition, the processing procedures, sequences, flowcharts, and the like of the aspects/embodiments described herein may be executed in different orders as long as consistency can be ensured. For example, the method described herein presents elements of various steps in an exemplary order without limiting to a specific order.

Each of the aspects/embodiments as described herein is applicable to a systems based on LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM® (Global System for Mobile communications), CDMA2000, UMB (Ultra Mobile Broadband), IEEE 802.11 (Wi-Fi®), IEEE 802.16 (WiMAX®), IEEE 802.20, UWB (Ultra-Wide-Band), or Bluetooth®, a system based on any other suitable radio communication method, and/or a next-generation system enhanced on the basis of them.

The phrase "based on ~" (or "on the basis of ~") as used herein does not signify "only based on" unless specified otherwise. In other words, the phrase "based on" signifies both "only based on" and "at least based on".

Any reference to elements using terminologies such as "first", "second", and so on as used herein does not limit the amount or order of these elements in general. These terminologies can be used herein in convenient manners for distinguishing between two or more elements. Accordingly, the reference to the first and second elements does not mean that only the two elements are used, or the first element is to precede the second element in any fashion.

In some cases, the word "determine or decide (determining)" as used herein may include various types of operations. For example, "determining or deciding" may be regarded as "determining or deciding" of calculating, computing, processing, deriving, investigating, looking up (such as search in a table, a database, or another data structure), or ascertaining. In addition, "determining or deciding" may be regarded as, for example, "determining or deciding" in receiving (such as receiving of information), transmitting (such as transmitting of information), input, output, accessing (such as accessing to data in a memory), or the like. Furthermore, "determining or deciding" may be regarded as "determining or deciding" in resolving, selecting, choosing, establishing, comparing, or the like. That is, "determining or deciding" may be regarded as "determining or deciding" of some operation.

The word "connected or coupled" or any variation thereof as used herein means all possible direct or indirect connections or coupling between two or more elements and may include existence of one or more intermediate elements between two elements mutually "connected" or "coupled". The coupling or connection between elements may be physical, logical, or in combination thereof. For example, the word "connection" may be replaced with "access".

As used herein, two elements may be regarded as being mutually "connected" or "coupled" using one or more electric wires, cables, and/or print electric interconnections, and as several non-limiting and non-comprehensive examples, using electromagnetic energy having a wavelength of a radio frequency domain, a microwave domain, and/or an optical (both visible and invisible) domain, or the like.

As used herein, the phrase "A and B are different" may mean "A and B are different from each other". Such an interpretation may also apply to the words "separated", "combined", and the like.

In a case where the word "including", "comprising" or any variation thereof is used in this specification or claims, such a word is intended to be "inclusive" as in the word "have". Furthermore, the word "or" as used in this specification or claims is intended not to mean "exclusive OR".

While the present invention has been described in details hereinbefore, it is apparent to those skilled in the art that the invention is not limited to the embodiments described herein. Various modifications and changes may be possible without departing from the spirit and scope of the present invention as defined in claims. Accordingly, the description is given only for illustrative purposes and is by no means intended to limit the present invention.

The invention claimed is:

1. A terminal comprising:
a receiver that receives a synchronization signal/physical broadcast channel (SS/PBCH) block including a synchronization signal (SS) and a physical broadcast channel (PBCH) which includes a subcarrier spacing information indicating a subcarrier spacing for a system information and for messages for an initial access, and includes a field for determination of a configuration of a control resource set; and
a processor that determines a configuration set from among a plurality of configuration sets, based on the subcarrier spacing information, and
determines the configuration of the control resource set from among configurations in the determined configuration set, based on a value of the field in the PBCH, and
the configuration including a plurality of parameters regarding the control resource set,
wherein the processor determines that a specified SS/PBCH block is not transmitted based on the configuration,
the plurality of parameters include a multiplexing scheme of the SS/PBCH block and the control resource set, a bandwidth of the control resource set, a duration of the control resource set, and a frequency offset of the control resource set relative to the SS/PBCH block, and
the multiplexing scheme is one of multiplexing schemes which includes a time division multiplexing scheme and a frequency division multiplexing scheme.

2. The terminal according to claim 1, wherein the processor monitors, in the control resource set, a downlink control channel for scheduling the system information.

3. The terminal according to claim 1, wherein the plurality of configuration sets include a first configuration set for a first band including a frequency equal to or lower than 6 GHz and include a second configuration set for a second band higher than the first band.

4. A radio communication method comprising:
receiving a synchronization signal/physical broadcast channel (SS/PBCH) block including a synchronization signal (SS) and a physical broadcast channel (PBCH) which includes a subcarrier spacing information indicating a subcarrier spacing for a system information and for messages for an initial access, and includes a field for determination of a configuration of a control resource set;
determining a configuration set from among a plurality of configuration sets, based on the subcarrier spacing information, and
determining the configuration of the control resource set from among configurations in the determined configuration set, based on the configuration being associated with a value of the field in the PBCH, and
the configuration including a plurality of parameters regarding the control resource set; and
determining that a specified SS/PBCH block is not transmitted based on the configuration,
the plurality of parameters include a multiplexing scheme of the SS/PBCH block and the control resource set, a bandwidth of the control resource set, a duration of the control resource set, and a frequency offset of the control resource set relative to the SS/PBCH block, and
the multiplexing scheme is one of multiplexing schemes which includes a time division multiplexing scheme and a frequency division multiplexing scheme.

5. A system comprising:
a terminal that comprises:
a receiver that receives a synchronization signal/physical broadcast channel (SS/PBCH) block including a synchronization signal (SS) and a physical broadcast channel (PBCH) which includes a subcarrier spacing information indicating a subcarrier spacing for a system information and for messages for an initial access, and includes a field for determination of a configuration of a control resource set; and
a processor that determines a configuration set from among a plurality of configuration sets, based on the subcarrier spacing information, and
determines the configuration of the control resource set from among configurations in the determined configuration set, based on a value of the field in the PBCH, and
the configuration including a plurality of parameters regarding the control resource set,
wherein the processor determines that a specified SS/PBCH block is not transmitted based on the configuration; and
a base station that transmits the SS/PBCH block,
wherein the plurality of parameters include a multiplexing scheme of the SS/PBCH block and the control resource set, a bandwidth of the control resource set, a duration of the control resource set, and a frequency offset of the control resource set relative to the SS/PBCH block, and
the multiplexing scheme is one of multiplexing schemes which includes a time division multiplexing scheme and a frequency division multiplexing scheme.

* * * * *